United States Patent
Maniatis et al.

(10) Patent No.: US 9,606,941 B2
(45) Date of Patent: *Mar. 28, 2017

(54) INSTRUCTION AND LOGIC FOR A BINARY TRANSLATION MECHANISM FOR CONTROL-FLOW SECURITY

(71) Applicant: Intel Corporation, Santa Clara, CA (US)

(72) Inventors: Petros Maniatis, Berkeley, CA (US); Shantanu Gupta, San Jose, CA (US); Naveen Kumar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,427

(22) Filed: Apr. 27, 2016

(65) Prior Publication Data
US 2016/0239438 A1    Aug. 18, 2016

Related U.S. Application Data

(63) Continuation of application No. 14/228,018, filed on Mar. 27, 2014, now Pat. No. 9,330,028.

(51) Int. Cl.
*G06F 12/14*    (2006.01)
*G06F 9/38*    (2006.01)
(Continued)

(52) U.S. Cl.
CPC ........ *G06F 12/1483* (2013.01); *G06F 9/3005* (2013.01); *G06F 9/3017* (2013.01); *G06F 9/35* (2013.01); *G06F 9/3836* (2013.01); *G06F 9/3867* (2013.01); *G06F 9/3877* (2013.01); *G06F 9/3887* (2013.01); *G06F 12/145* (2013.01); *G06F 12/1491* (2013.01); *G06F 13/1615* (2013.01); *G06F 13/1663* (2013.01);
(Continued)

(58) Field of Classification Search
CPC .... G06F 9/3867; G06F 9/3887; G06F 12/145; G06F 12/1491; G06F 13/1615; G06F 21/52; G06F 9/3005; G06F 9/3017; G06F 9/3836; G06F 13/1663; G06F 2212/1052; G06F 12/14; G06F 13/16; G06F 9/38
USPC ................................. 711/163, 169; 712/201
See application file for complete search history.

(56) References Cited

U.S. PATENT DOCUMENTS 6,247,062 B1 *  6/2001  Sarkar ..................... H04L 45/00
                                                                 370/409
6,535,903 B2    3/2003  Yates
(Continued)

*Primary Examiner* — Pierre-Michel Bataille
(74) *Attorney, Agent, or Firm* — Baker Botts L.L.P.

(57) ABSTRACT

A processor includes a front end, an execution pipeline, and a binary translator. The front end includes logic to receive an instruction and to dispatch the instruction to a binary translator. The binary translator includes logic to determine whether the instruction includes a control-flow instruction, identify a source address of the instruction, identify a target address of the instruction, determine whether the target address is a known destination based upon the source address, and determine whether to route the instruction to the execution pipeline based upon the determination whether the target address is a known destination based upon the source address. The target address includes an address to which execution would indirectly branch upon execution of the instruction.

20 Claims, 20 Drawing Sheets

(51) Int. Cl.
*G06F 13/16* (2006.01)
*G06F 9/30* (2006.01)
*G06F 21/52* (2013.01)
*G06F 9/35* (2006.01)

(52) U.S. Cl.
CPC ...... *G06F 21/52* (2013.01); *G06F 2212/1052* (2013.01)

(56) References Cited

U.S. PATENT DOCUMENTS

| | | | |
|---|---|---|---|
| 8,074,055 B1 * | 12/2011 | Yates, Jr. | G06F 9/3005 |
| | | | 712/209 |
| 8,788,792 B2 | 7/2014 | Yates | |
| 9,317,288 B2 * | 4/2016 | Henry | G06F 9/30174 |
| 9,336,180 B2 * | 5/2016 | Ebersole | G06F 9/30076 |
| 2012/0260067 A1 | 10/2012 | Henry | |
| 2013/0339664 A1 | 12/2013 | Ould-Ahmed-Vall | |

* cited by examiner

EXECUTION POINTER 1002

| ADDRESS | ASSEMBLY | |
|---------|----------|---|
| 0x1000 | POP EBX | < POP VALUE, WHICH IS A MALICIOUS FUNCTION ADDRESS 0x1508, FROM STACK > |
| ⋮ | | |
| 0x1001 | JMP * EBX | < JUMP TO MALICIOUS FUNCTION AT 0x1508 > |
| ... | | |
| → 0x1230 | JMP * EAX | < JUMP TO ADDRESS LOADED IN EAX REGISTER > |
| ... | | |

⇒ CMS CHECKS IF VALUE OF EAX IS TO BE EXPECTED OR IS UNKNOWN.
0x1000, 0x1002, 0x1508    0x1300

| 0x1300 | [ FUNCTION 1 CODE ] | < CODE FOR EXPECTED FUNCTION > |
| ... | | |
| 0x1508 | [ FUNCTION 2 CODE ] | < CODE FOR MALICIOUS FUNCTION > |

INSTRUCTION AND LOGIC FOR A BINARY TRANSLATION MECHANISM FOR CONTROL-FLOW SECURITY

RELATED APPLICATION

This application is a Continuation of U.S. patent application Ser. No. 14/228,018 filed Mar. 27, 2014, which is incorporated herein by reference in its entirety.

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another.

Choosing cryptographic routines may include choosing trade-offs between security and resources necessary to implement the routine. While some cryptographic routines are not as secure as others, the resources necessary to implement them may be small enough to enable their use in a variety of applications where computing resources, such as processing power and memory, are less available than, for example, a desktop computer or larger computing scheme. The cost of implementing routines such as cryptographic routines may be measured in gate counts or gate-equivalent counts, throughput, power consumption, or production cost. Several cryptographic routines for use in computing applications include those known as AES, Hight, Iceberg, Katan, Klein, Led, mCrypton, Piccolo, Present, Prince, Twine, and EPCBC, though these routines are not necessarily compatible with each other, nor may one routine necessarily substitute for another.

DESCRIPTION OF THE FIGURES

Embodiments are illustrated by way of example and not limitation in the Figures of the accompanying drawings:

FIG. 10 is an illustration of example operation of system to perform control-flow security in view of a malicious attack, in accordance with embodiments of the present disclosure;

DETAILED DESCRIPTION

Figure 1A:
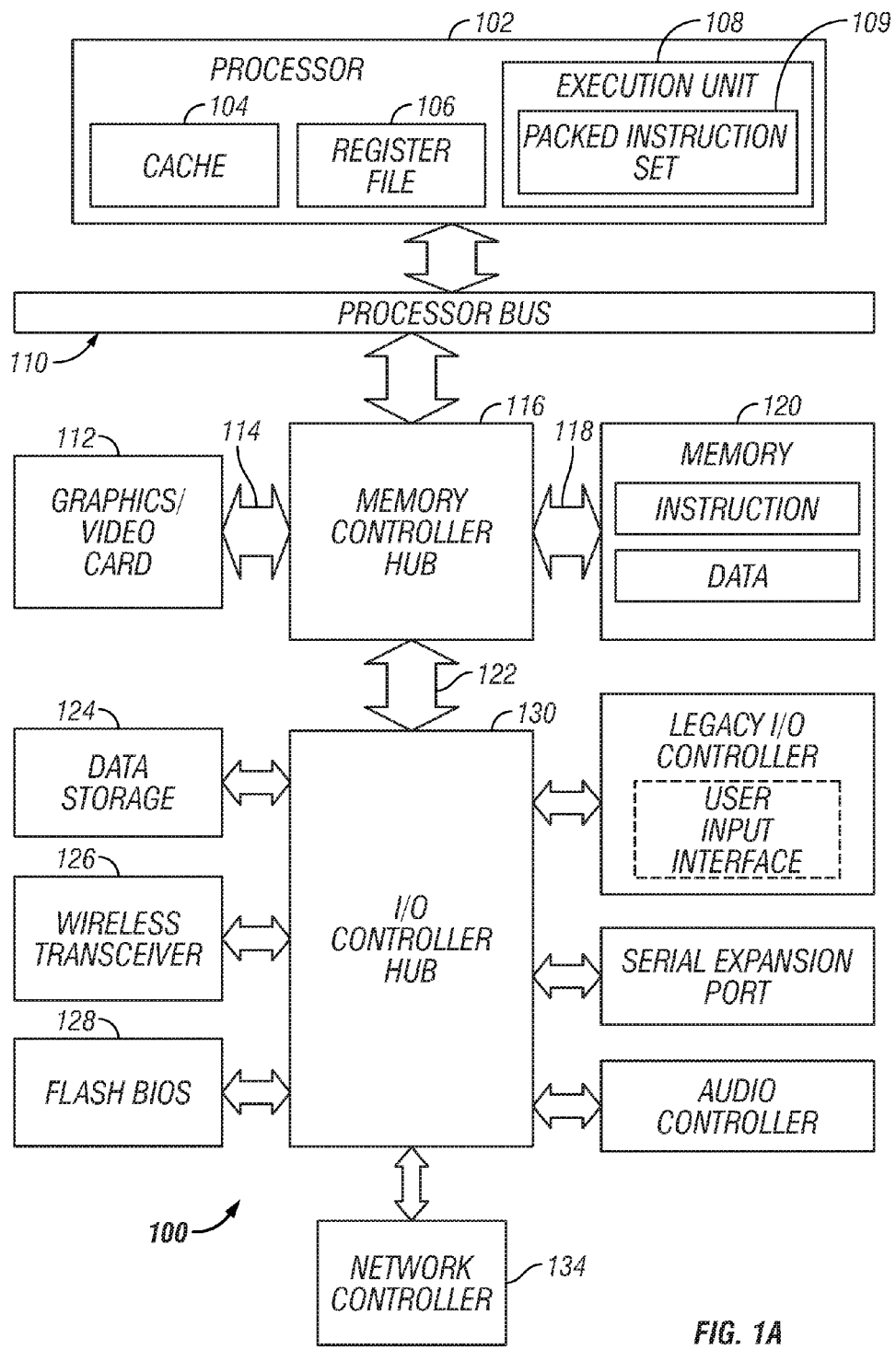
FIG. 1A is a block diagram of an exemplary computer system formed with a processor that may include execution units to execute an instruction, in accordance with embodiments of the present disclosure.

The following description describes an instruction and processing logic for an instruction and logic for a binary translation mechanism for control-flow security within or in association with a processor, virtual processor, package, computer system, or other processing apparatus. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Discs, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT)), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a Dynamic Random Access Memory (DRAM) device, a Static Random Access Memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
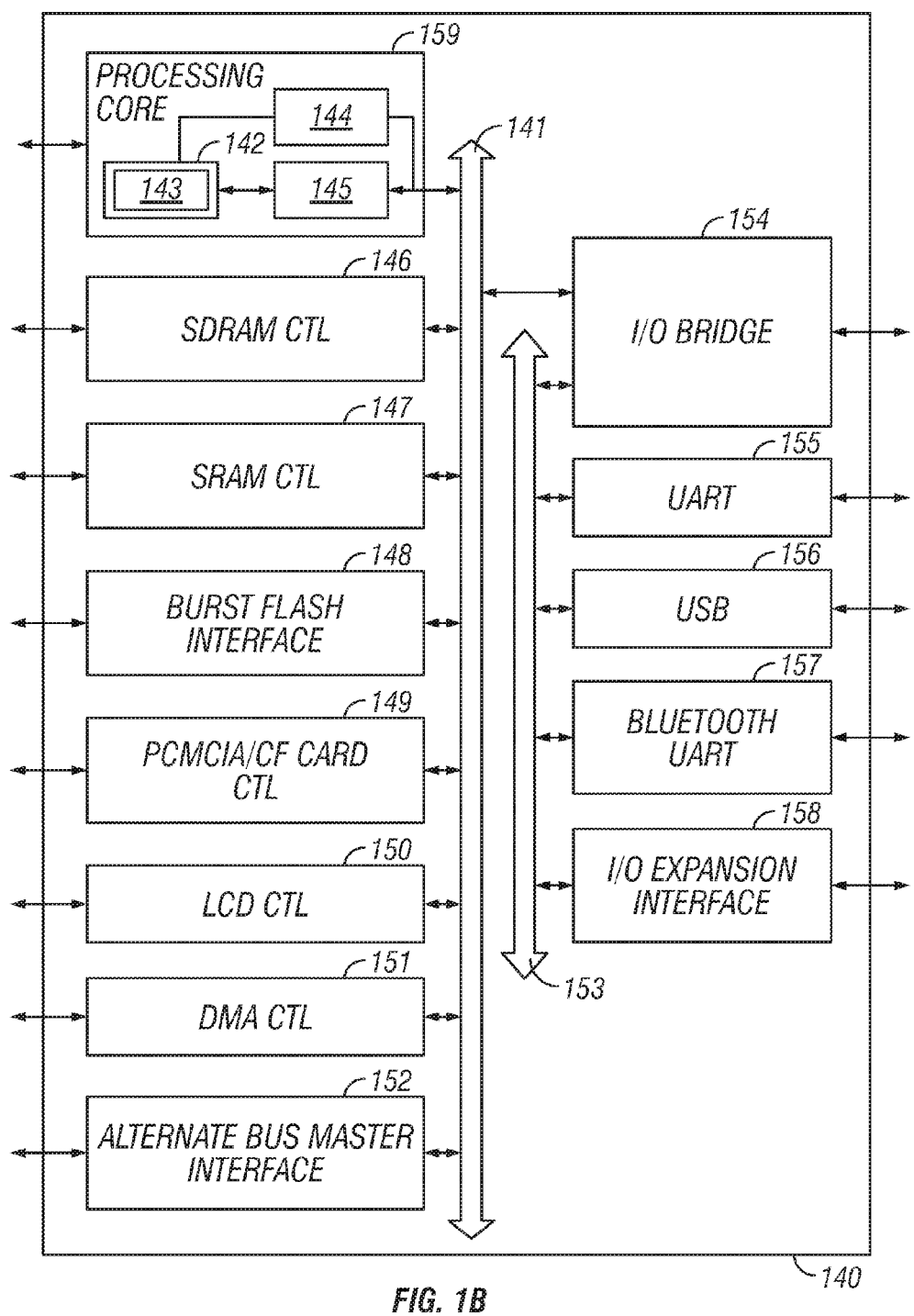
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW-type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, Synchronous Dynamic Random Access Memory (SDRAM) control 146, Static Random Access Memory (SRAM) control 147, burst flash memory interface 148, Personal Computer Memory Card International Association (PCMCIA)/Compact Flash (CF) card control 149, Liquid Crystal Display (LCD) control 150, Direct Memory Access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, Universal Asynchronous Receiver/Transmitter (UART) 155, Universal Serial Bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
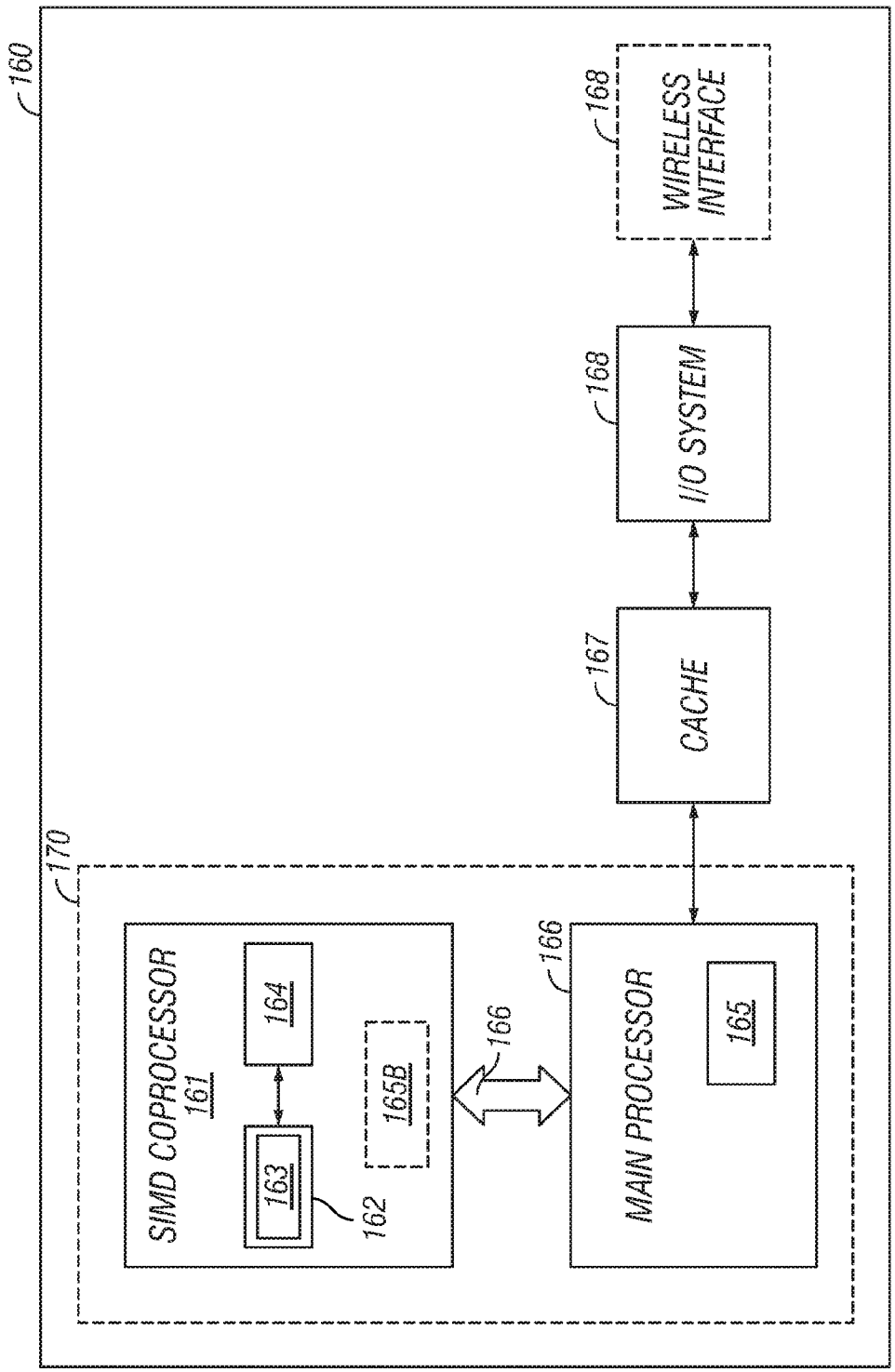
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
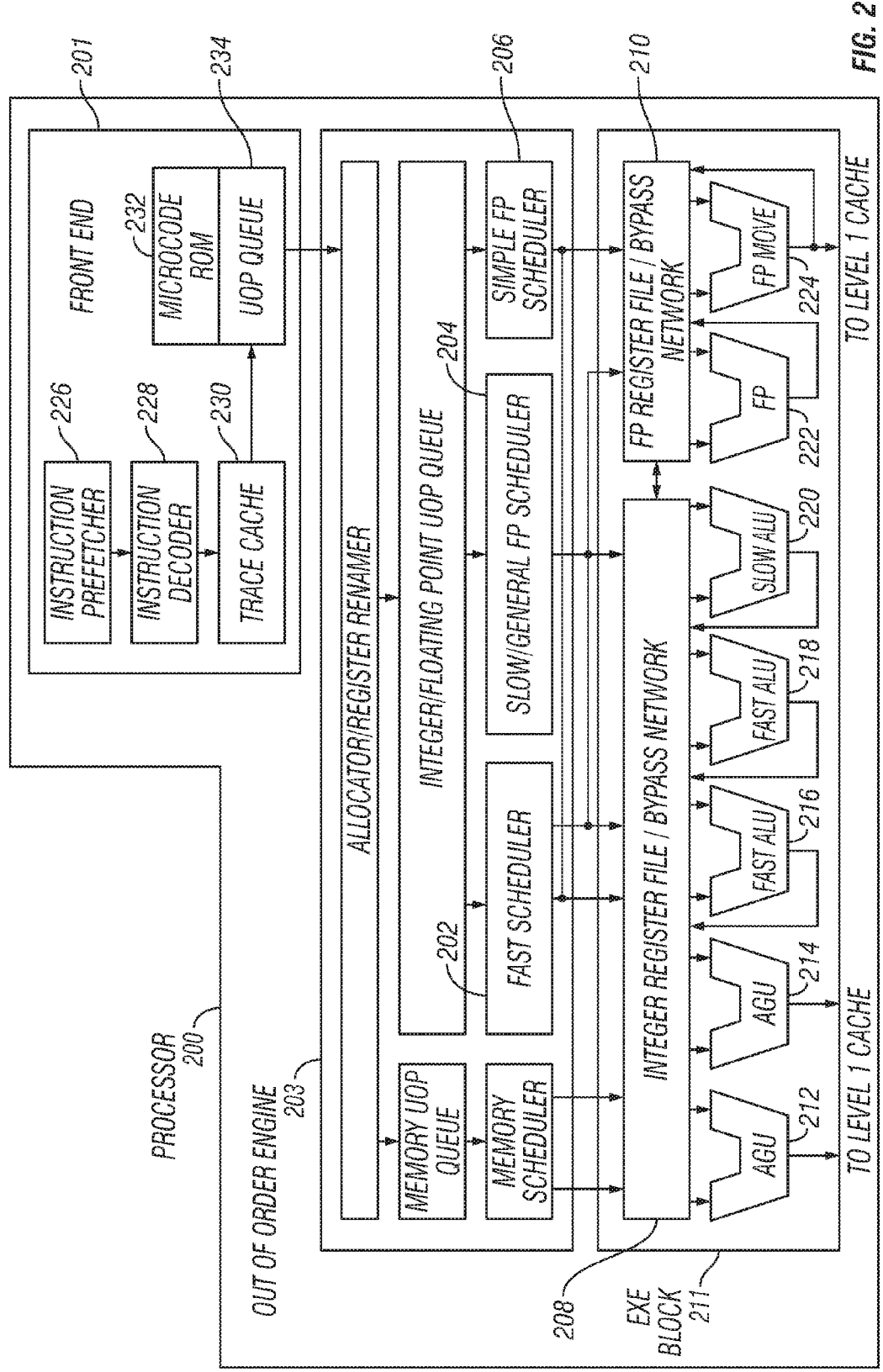
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro-ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast Arithmetic Logic Unit (ALU) 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
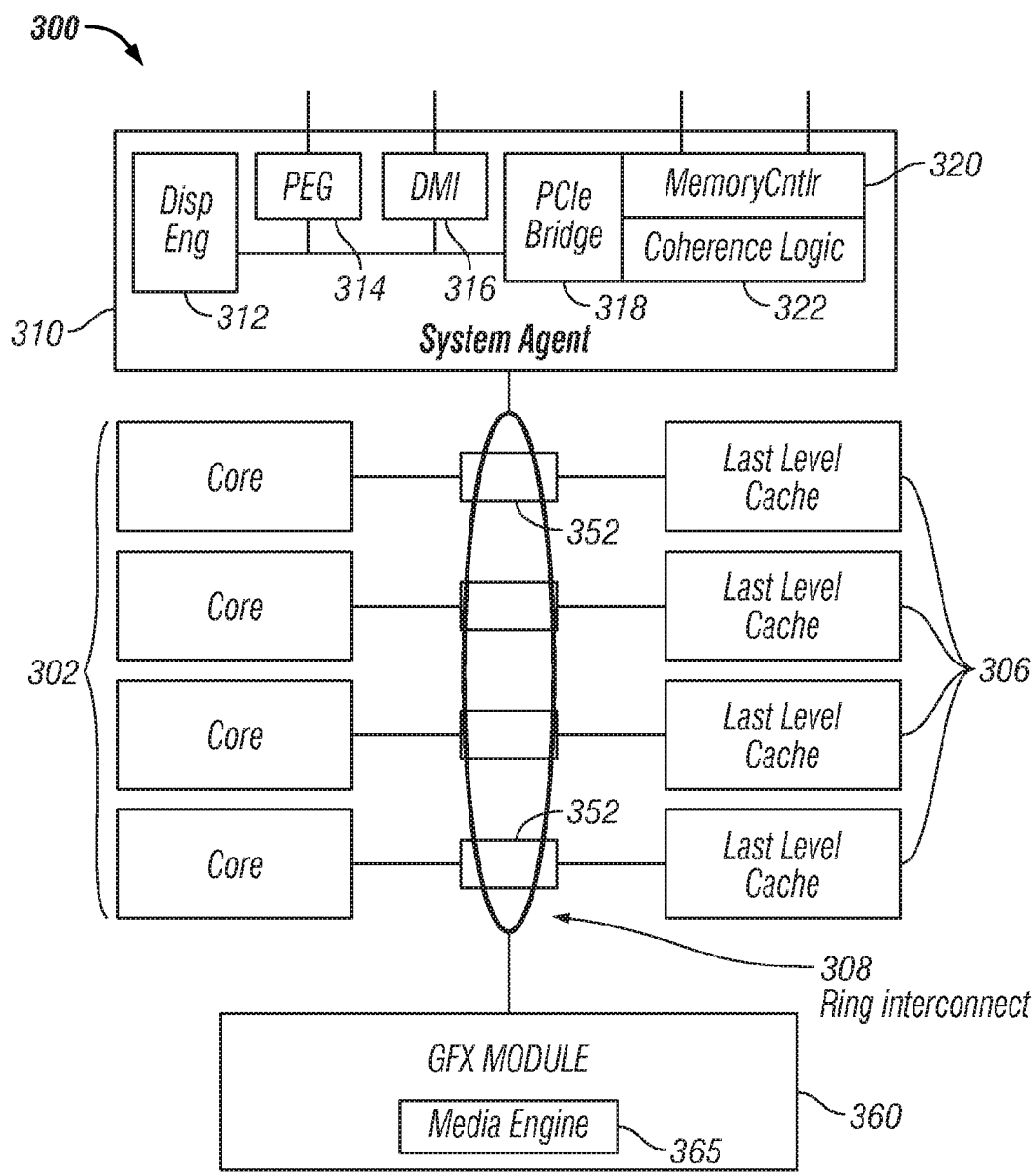
FIG. 3A is a block diagram of a processor, in accordance with embodiments of the present disclosure.
Figure 3B:
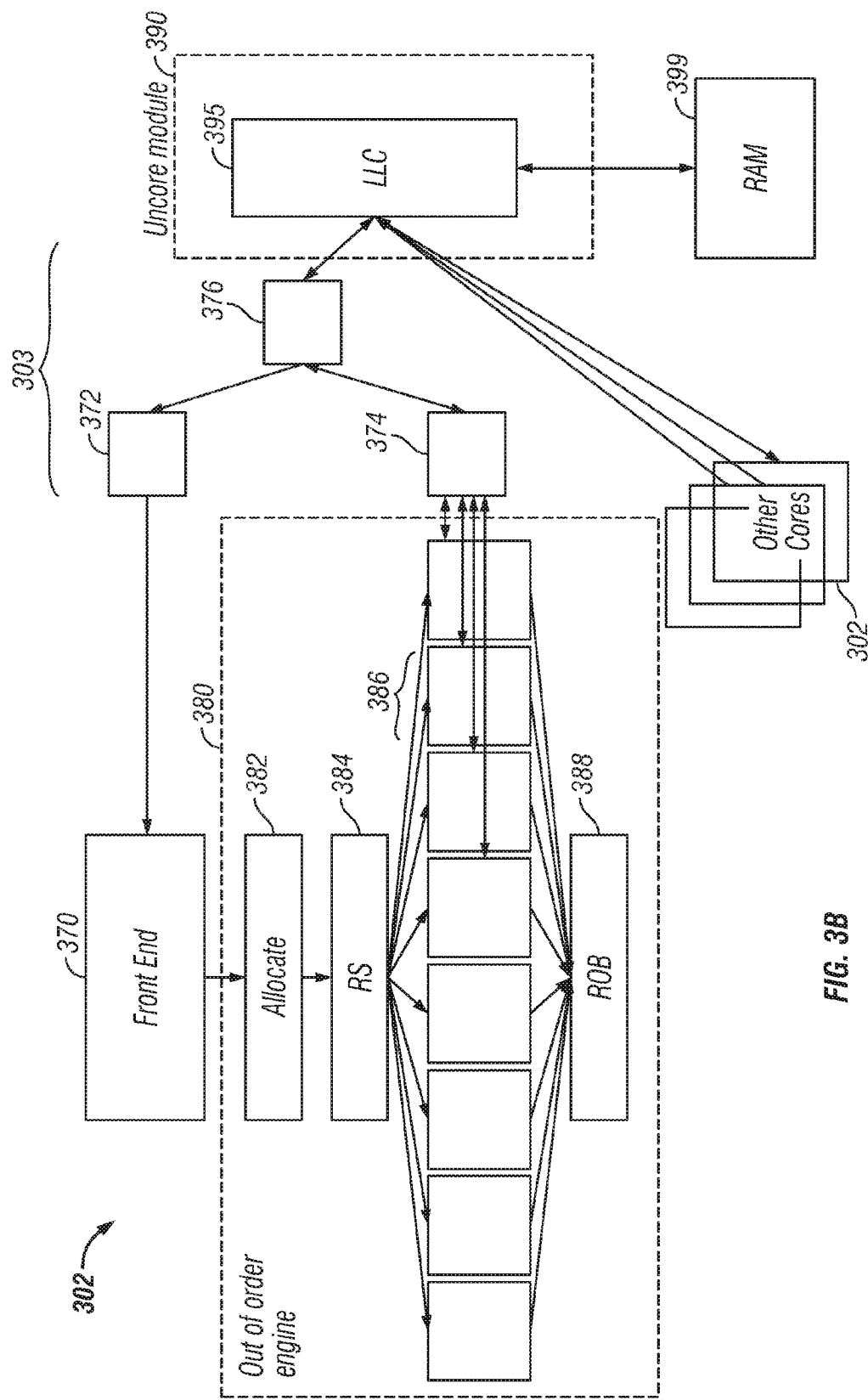
FIG. 3B is a block diagram of an example implementation of a core, in accordance with embodiments of the present disclosure.
Figure 4:
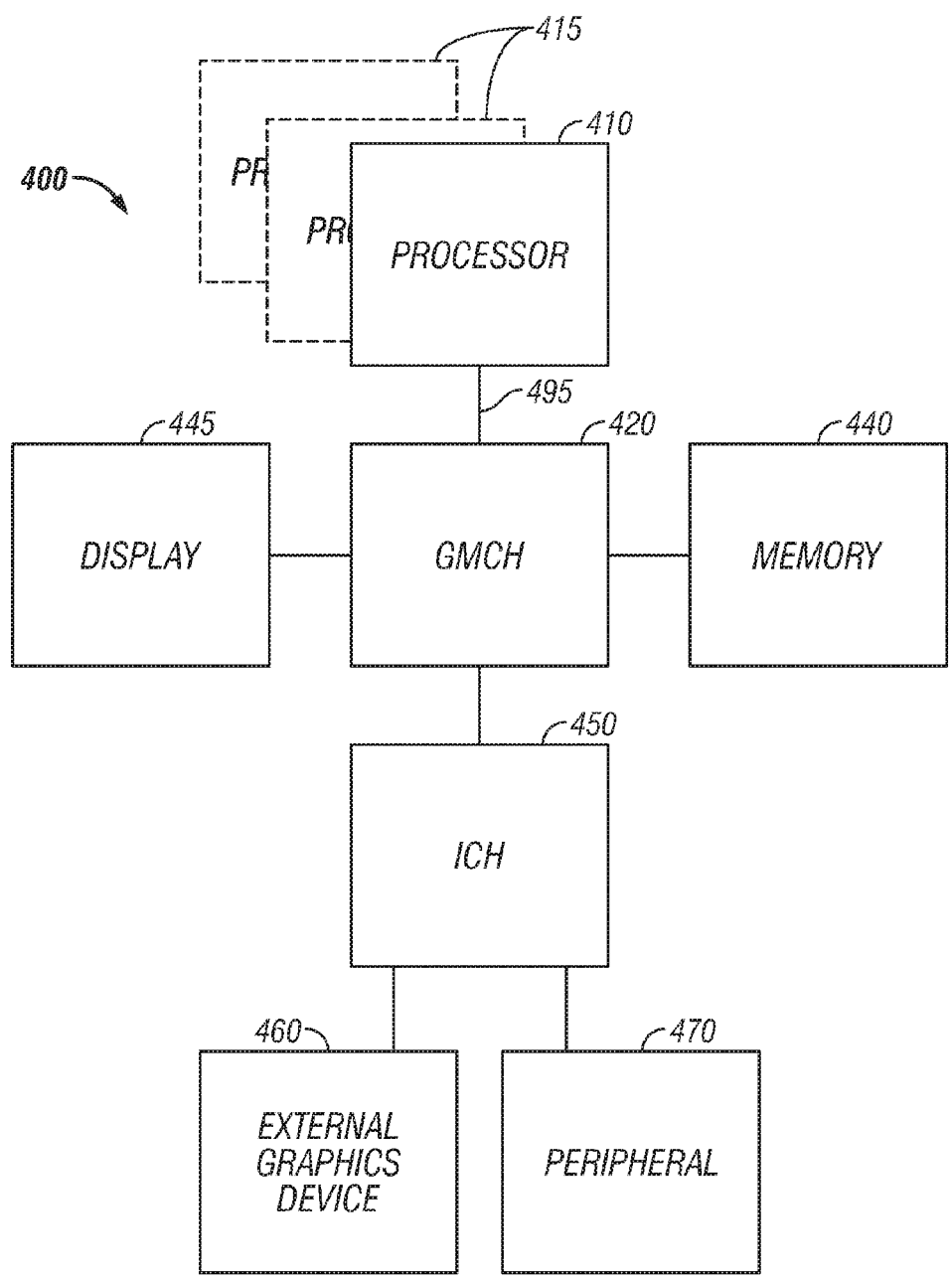
FIG. 4 is a block diagram of a system, in accordance with embodiments of the present disclosure.
Figure 5:
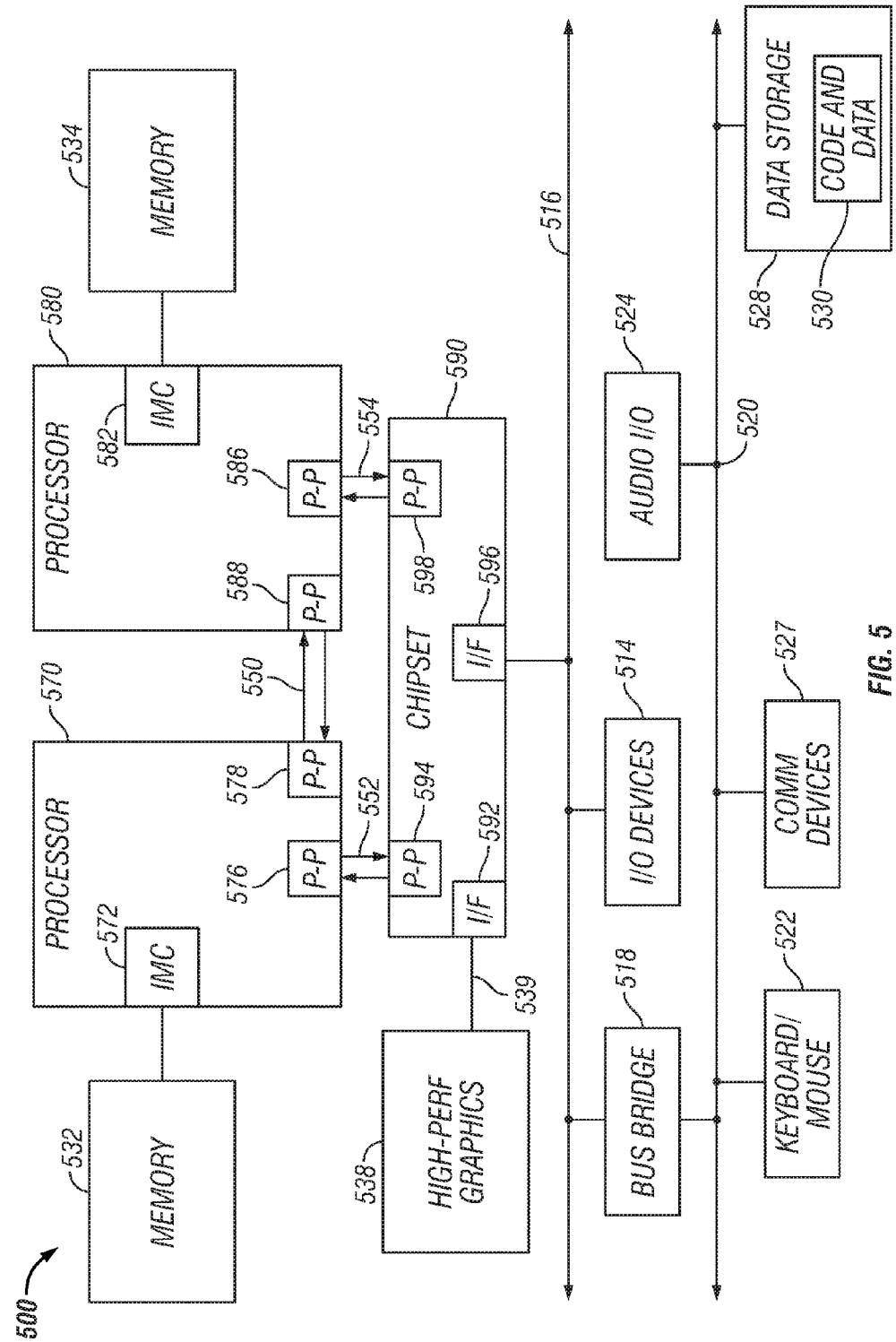
FIG. 5 is a block diagram of a second system, in accordance with embodiments of the present disclosure.

FIGS. 3-5 may illustrate exemplary systems suitable for including processor 300, while FIG. 4 may illustrate an exemplary System on a Chip (SoC) that may include one or more of cores 302. Other system designs and implementations known in the arts for laptops, desktops, handheld PCs, personal digital assistants, engineering workstations, servers, network devices, network hubs, switches, embedded processors, DSPs, graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 4 illustrates a block diagram of a system 400, in accordance with embodiments of the present disclosure. System 400 may include one or more processors 410, 415, which may be coupled to Graphics Memory Controller Hub (GMCH) 420. The optional nature of additional processors 415 is denoted in FIG. 4 with broken lines.

Each processor 410, 415 may be some version of processor 300. However, it should be noted that integrated graphics logic and integrated memory control units might not exist in processors 410, 415. FIG. 4 illustrates that GMCH 420 may be coupled to a memory 440 that may be, for example, a dynamic random access memory (DRAM). The DRAM may, for at least one embodiment, be associated with a non-volatile cache.

GMCH 420 may be a chipset, or a portion of a chipset. GMCH 420 may communicate with processors 410, 415 and control interaction between processors 410, 415 and memory 440. GMCH 420 may also act as an accelerated bus interface between the processors 410, 415 and other elements of system 400. In one embodiment, GMCH 420 communicates with processors 410, 415 via a multi-drop bus, such as a frontside bus (FSB) 495.

Furthermore, GMCH 420 may be coupled to a display 445 (such as a flat panel display). In one embodiment, GMCH 420 may include an integrated graphics accelerator. GMCH 420 may be further coupled to an input/output (I/O) controller hub (ICH) 450, which may be used to couple various peripheral devices to system 400. External graphics device 460 may include be a discrete graphics device coupled to ICH 450 along with another peripheral device 470.

In other embodiments, additional or different processors may also be present in system 400. For example, additional processors 410, 415 may include additional processors that may be the same as processor 410, additional processors that may be heterogeneous or asymmetric to processor 410, accelerators (such as, e.g., graphics accelerators or digital signal processing (DSP) units), field programmable gate arrays, or any other processor. There may be a variety of differences between the physical resources 410, 415 in terms of a spectrum of metrics of merit including architectural, micro-architectural, thermal, power consumption characteristics, and the like. These differences may effectively manifest themselves as asymmetry and heterogeneity amongst processors 410, 415. For at least one embodiment, various processors 410, 415 may reside in the same die package.

FIG. 5 illustrates a block diagram of a second system 500, in accordance with embodiments of the present disclosure. As shown in FIG. 5, multiprocessor system 500 may include a point-to-point interconnect system, and may include a first processor 570 and a second processor 580 coupled via a point-to-point interconnect 550. Each of processors 570 and 580 may be some version of processor 300 as one or more of processors 410,615.

While FIG. 5 may illustrate two processors 570, 580, it is to be understood that the scope of the present disclosure is not so limited. In other embodiments, one or more additional processors may be present in a given processor.

Processors 570 and 580 are shown including integrated memory controller units 572 and 582, respectively. Processor 570 may also include as part of its bus controller units point-to-point (P-P) interfaces 576 and 578; similarly, second processor 580 may include P-P interfaces 586 and 588. Processors 570, 580 may exchange information via a point-to-point (P-P) interface 550 using P-P interface circuits 578, 588. As shown in FIG. 5, IMCs 572 and 582 may couple the processors to respective memories, namely a memory 532 and a memory 534, which in one embodiment may be portions of main memory locally attached to the respective processors.

Processors 570, 580 may each exchange information with a chipset 590 via individual P-P interfaces 552, 554 using point to point interface circuits 576, 594, 586, 598. In one embodiment, chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 516, along with a bus bridge 518 which couples first bus 516 to a second bus 520. In one embodiment, second bus 520 may be a Low Pin Count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures may be possible. For example, instead of the point-to-point architecture of FIG. 5, a system may implement a multi-drop bus or other such architecture.

Figure 6:
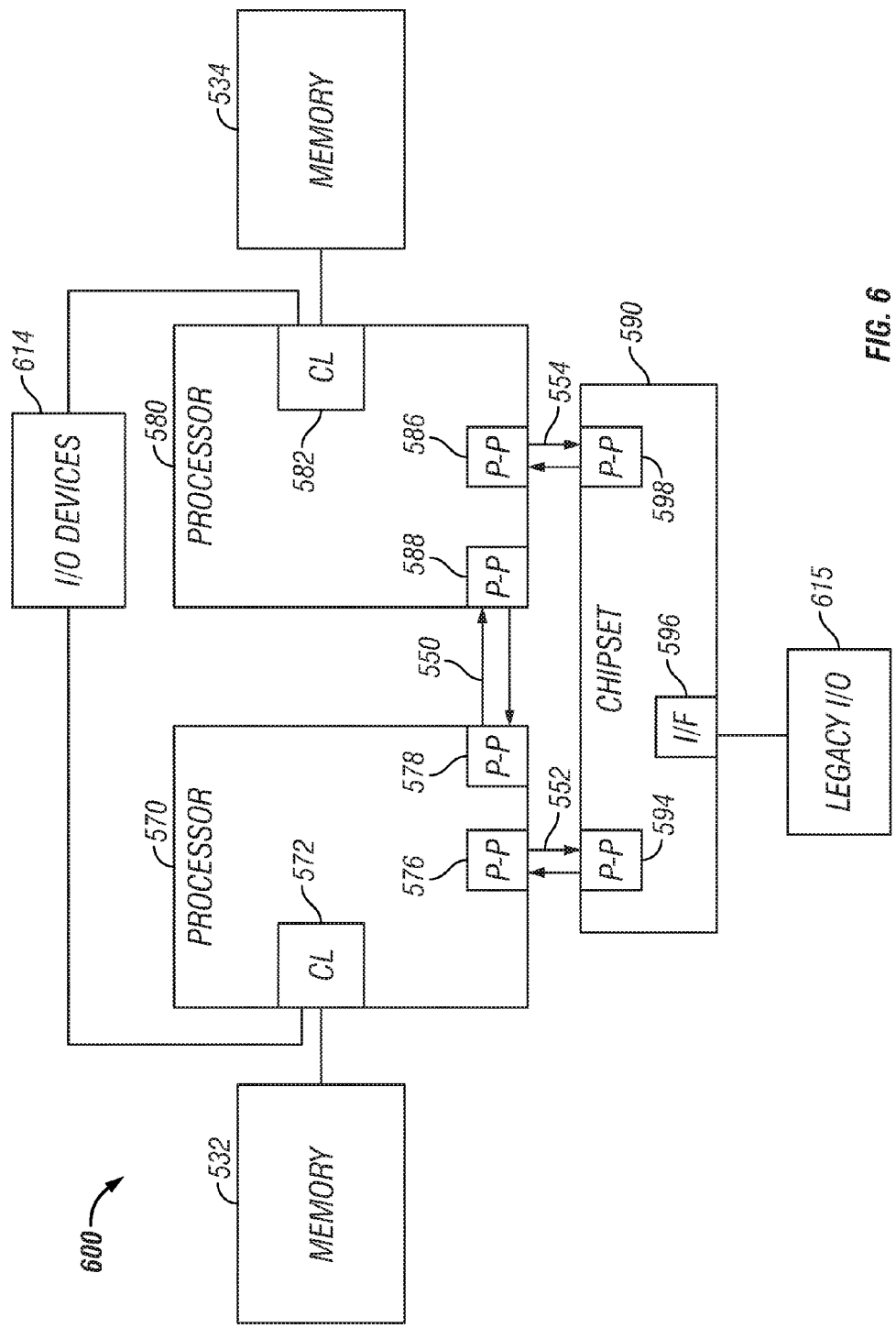
FIG. 6 is a block diagram of a third system in accordance with embodiments of the present disclosure.

FIG. 6 illustrates a block diagram of a third system 600 in accordance with embodiments of the present disclosure. Like elements in FIGS. 5 and 6 bear like reference numerals, and certain aspects of FIG. 5 have been omitted from FIG. 6 in order to avoid obscuring other aspects of FIG. 6.

FIG. 6 illustrates that processors 670, 680 may include integrated memory and I/O Control Logic ("CL") 672 and 682, respectively. For at least one embodiment, CL 672, 682 may include integrated memory controller units such as that described above in connection with FIGS. 3-5. In addition. CL 672, 682 may also include I/O control logic. FIG. 6 illustrates that not only memories 632, 634 may be coupled to CL 672, 682, but also that I/O devices 614 may also be coupled to control logic 672, 682. Legacy I/O devices 615 may be coupled to chipset 690.

Figure 7:
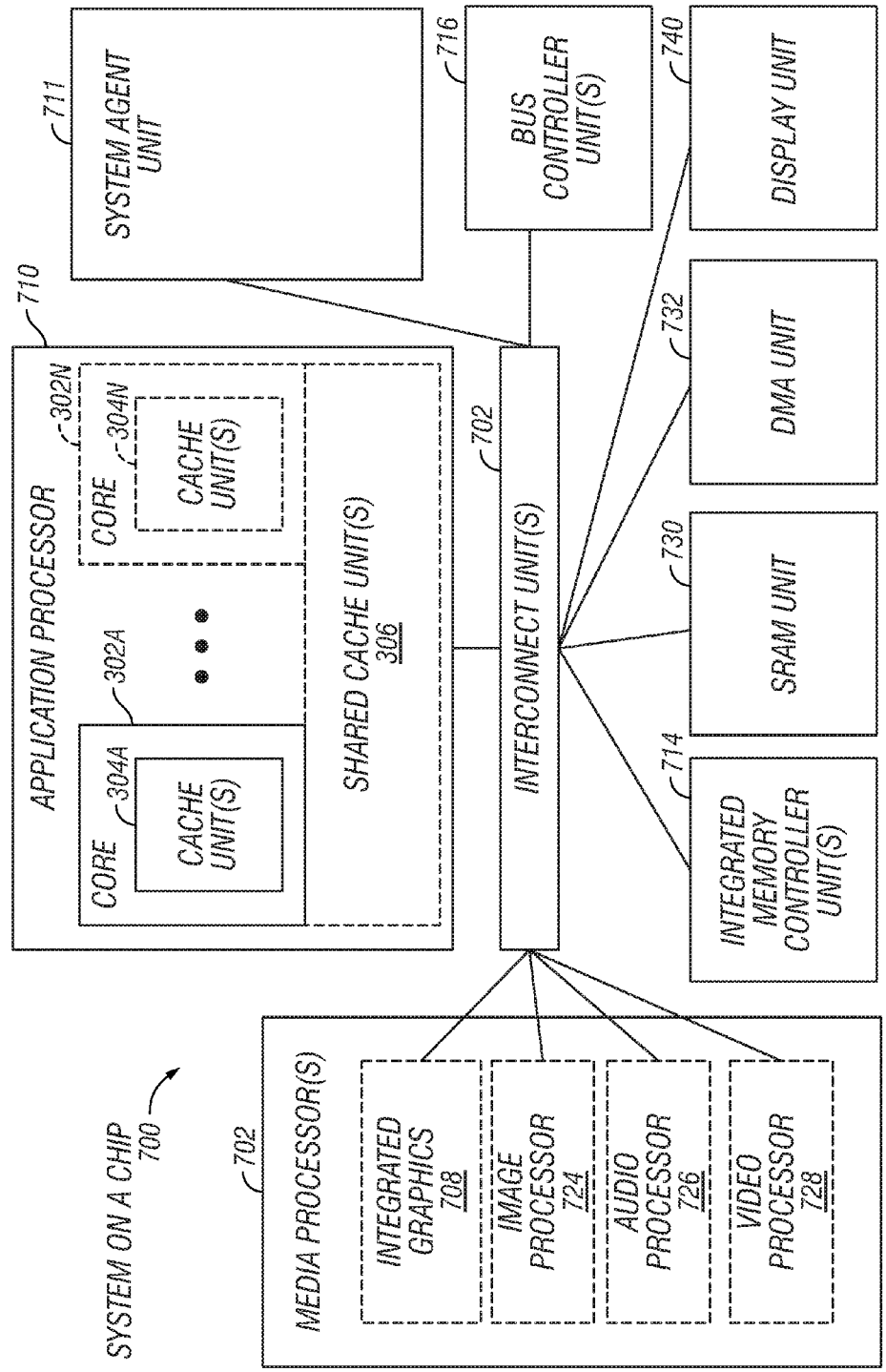
FIG. 7 is a block diagram of a system-on-a-chip, in accordance with embodiments of the present disclosure.

FIG. 7 illustrates a block diagram of a SoC 700, in accordance with embodiments of the present disclosure. Similar elements in FIG. 3 bear like reference numerals. Also, dashed lined boxes may represent optional features on more advanced SoCs. An interconnect units 702 may be coupled to: an application processor 710 which may include a set of one or more cores 702A-N and shared cache units 706; a system agent unit 711; a bus controller units 716; an integrated memory controller units 714; a set or one or more media processors 720 which may include integrated graphics logic 708, an image processor 724 for providing still and/or video camera functionality, an audio processor 726 for providing hardware audio acceleration, and a video processor 728 for providing video encode/decode acceleration; an SRAM unit 730; a DMA unit 732; and a display unit 740 for coupling to one or more external displays.

Figure 8:
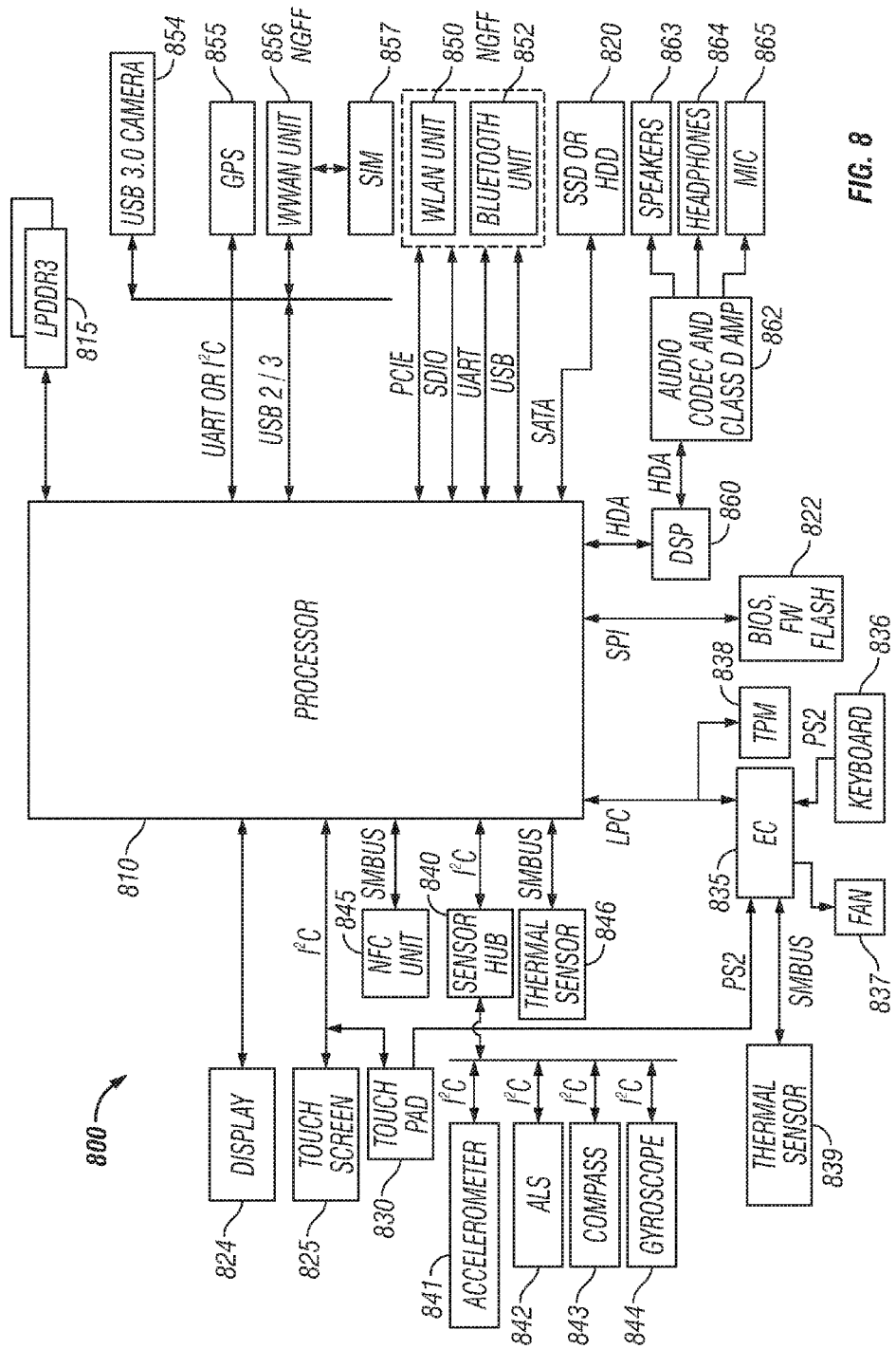
FIG. 8 is a block diagram of an electronic device for utilizing a processor, in accordance with embodiments of the present disclosure.

FIG. 8 is a block diagram of an electronic device 800 for utilizing a processor 810, in accordance with embodiments of the present disclosure. Electronic device 800 may include, for example, a notebook, an ultrabook, a computer, a tower server, a rack server, a blade server, a laptop, a desktop, a tablet, a mobile device, a phone, an embedded computer, or any other suitable electronic device.

Electronic device 800 may include processor 810 communicatively coupled to any suitable number or kind of components, peripherals, modules, or devices. Such coupling may be accomplished by any suitable kind of bus or interface, such as I$^2$C bus, System Management Bus (SM-Bus), Low Pin Count (LPC) bus, SPI, High Definition Audio (HDA) bus, Serial Advance Technology Attachment (SATA) bus, USB bus (versions 1, 2, 3), or Universal Asynchronous Receiver/Transmitter (UART) bus.

Such components may include, for example, a display 824, a touch screen 825, a touch pad 830, a Near Field Communications (NFC) unit 845, a sensor hub 840, a thermal sensor 846, an Express Chipset (EC) 835, a Trusted Platform Module (TPM) 838, BIOS/firmware/flash memory 822, a DSP 860, a drive 820 such as a Solid State Disk (SSD) or a Hard Disk Drive (HDD), a wireless local area network (WLAN) unit 850, a Bluetooth unit 852, a Wireless Wide Area Network (WWAN) unit 856, a Global Positioning System (GPS), a camera 854 such as a USB 3.0 camera, or a Low Power Double Data Rate (LPDDR) memory unit 815 implemented in, for example, the LPDDR3 standard. These components may each be implemented in any suitable manner.

Furthermore, in various embodiments other components may be communicatively coupled to processor 810 through the components discussed above. For example, an accelerometer 841, Ambient Light Sensor (ALS) 842, compass 843, and gyroscope 844 may be communicatively coupled to sensor hub 840. A thermal sensor 839, fan 837, keyboard 846, and touch pad 830 may be communicatively coupled to EC 835. Speaker 863, headphones 864, and a microphone 865 may be communicatively coupled to an audio unit 864, which may in turn be communicatively coupled to DSP 860. Audio unit 864 may include, for example, an audio codec and a class D amplifier. A SIM card 857 may be communicatively coupled to WWAN unit 856. Components such as WLAN unit 850 and Bluetooth unit 852, as well as WWAN unit 856 may be implemented in a Next Generation Form Factor (NGFF).

Figure 9:
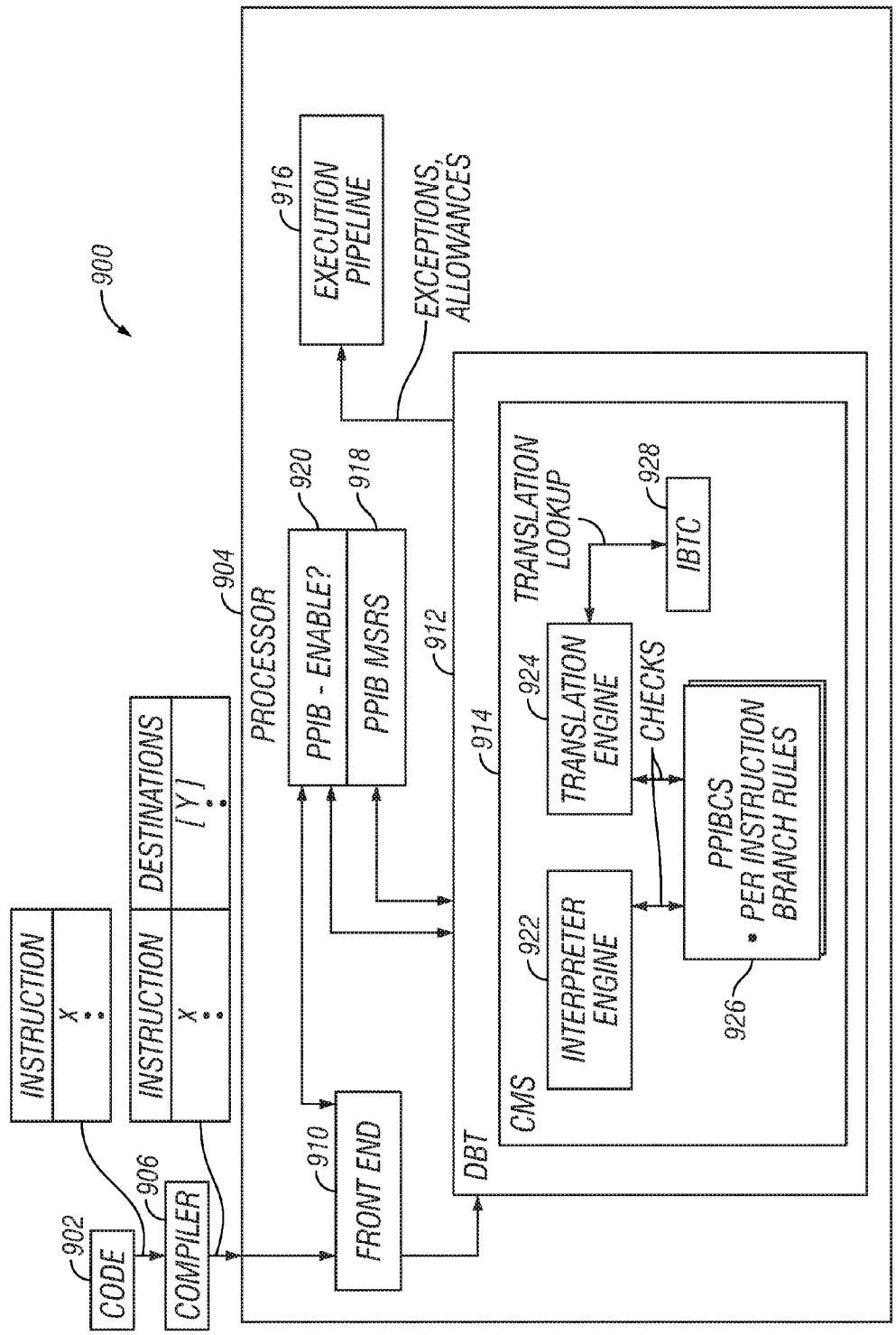
FIG. 9 illustrates an example system for implementing a binary translation mechanism for control-flow security, in accordance with embodiments of the present disclosure.

Embodiments of the present disclosure involve an instruction and logic for a binary translation mechanism for control-flow security. FIG. 9 illustrates an example system 900 for implementing a binary translation mechanism for control-flow security, in accordance with embodiments of the present disclosure. System 900 may perform control-flow security upon any suitable code, object code, operations, or similar instructions for causing a processor to perform specified actions. For example, system 900 may perform control-flow security upon code 902. In order to perform control-flow security upon 902, system 900 may include, for example, a processor 904. In one embodiment, processor 904 may both perform control-flow security upon code 902 and execute code 902. In another embodiment, processor 904 may perform control-flow security upon code 902 and send the result to another processing entity for execution. Although various elements of system 900 are described herein as example embodiments, any suitable portion of system 900 may perform the functionality described herein.

Code 902 may be within processor 904 or may be sent to processor 904 by another entity. Furthermore, code 902 may be processed in any suitable manner before arriving at processor 904. For example, code 902 may be first compiled, interpreted, linked, or otherwise processed by a compiler 906. Compiler 906 may then issue object code or other executable form of code 902 to processor 904.

System 900 may perform any suitable kind of control-flow security upon code 902. In one embodiment, system 900 may perform security with respect to branching in code 902. Such branching may include, for example, JMP, CALL, or RET instructions. In another embodiment, system 900 may perform branching security by evaluating the destination for the branching instruction. In yet another embodiment, system 900 may perform branching security by evaluating the source for the branching instruction. In still yet another embodiment, system 900 may perform branching security by evaluating the destination of the branching instruction in view of the source. The branching may include indirect branches. As system 900 may protect paths for such indirect branches, the protection scheme may be referred to as Path Protect for Indirect Branches (PPIB).

Any suitable mechanism may be used to determine, given a source of a branching instruction, what destinations in code 904 are allowed given a control-flow instruction at a given source address in code 904. In one embodiment, such an association may be made by compiler 906, a linker, a runtime reference monitor, or a programmer of code. In another embodiment, such an association may be made within processor 904 by, for example, a binary translator or a compiler.

Processor 904 may be implemented in part by any suitable combination of processors, cores, or other elements shown in FIGS. 1-8. In various embodiments, processor may include a front end 910 communicatively coupled to a dynamic binary translator (DBT) 914 and to hardware extensions to support control-flow security. Furthermore, processor may include an execution pipeline 916 communicatively coupled to DBT 914 to receive and execute instructions as they are translated. Front end 910 may fetch instructions to be executed and prepare such instructions to be used by other elements of processor 914. In one embodiment, front end 910 may parse instructions received and enable hardware extensions to support control-flow security. Execution pipeline 916 may execute instructions in any suitable manner, such as in an out-of-order manner. Execution pipeline 916 may write results of executed instructions to memory, registers, or cache.

Processor 904 may include any suitable number and kind of hardware extensions to support control-flow security. In one embodiment, processor 904 may include an enable extension 920, which may be set to indicate whether control-flow security is turned on or not. Enable extension 920 may be set by any suitable part of system 900. For example, enable extension 920 may be set by front end 910 based on indications in code 902 that control-flow security will be used. In another example, DBT 912 may set enable extension 920. Enable extension 920 may be referred to as "PPIB-Enable". In another embodiment, processor 904 may include any suitable number and kind of model specific registers (MSRs) 918 for the PPIB scheme. MSRs 918 may be referred to as "PPIB-MSRs". MSRs 918 may include boundaries for tables to be used by DBT 912, as explained below.

DBT 912 may translate instructions from code 902 for more efficient, more reliable, or otherwise changed execution on processor 904. To perform such operations, DBT 912 may translate code 902, keep or modify the translation, and pass the result to execution pipeline 916 for execution. In one embodiment, DBT 912 may emulate execution of code 902. DBT 912 may cause breakpoints, exceptions, or interrupts to be generated under certain targeted conditions. In one embodiment, DBT 912 may cause breakpoints, exceptions, or interrupts to be generated when control-flow is passed to an unknown or dangerous location. DBT 912 may store portions of code 902 as it is executed or translated. Upon analysis of later code, DBT 912 may determine whether the new portions of code 902 have already been translated and executed. If such a determination is made, DBT 912 may change the code to refer to these already translated and executed portions. The determination of whether portions of code 902 have already been translated and executed may be made upon branch operations. DBT 912 may thus increase the efficiency of system 900 by optimizing execution.

DBT 912 may include any suitable number or kind of elements to perform control-flow security. In one embodiment, DBT 912 may include a module for code morphing software (CMS) 914. CMS 914 may include, for example, modules for translation of code, modules for evaluating previously translated code, rules to determine whether a given branching operation is allowed, and caches. In one embodiment, CMS 914 may include an interpreter engine 922 to interpret instructions as received from code 902. In another embodiment, CMS 914 may include a translation engine 924 to translate code 902 into a form optimal or more efficient for direct hardware execution. In yet another embodiment, CMS 914 may include one or more PPIB control structures (PPIBCS) 926 to determine branching rules. In another embodiment, CMS 914 may include an indirect branch target cache 928 to use as a local cache that includes previously made indirect-branch targets.

PPIBCS 922 may be included within any suitable memory, cache, or other portion of system 900. PPIB MSRs 918 may be used by, for example, CMS 914 to determine the ranges and bounds of PPIBCS 926. PPIBCS 926 may be initialized, stored, cached, or refreshed by any suitable portion of system 900. For example, CMS 914 or front end 910 may manage PPIBCS 926 and the contents thereof. The contents of PPIBCS 926 may define, for given instructions in code 902, to what destinations an indirect branch are allowed to be made. Upon receipt of newer instructions, insufficient space in PPIBCS 926, or other changes to execution, PPIBCS 926 may be refreshed based upon newer indirect instructions and their corresponding permitted destinations. In such a case, existing copies of PPIBCS 926 may be flushed from memory or a cache, a new version constructed, and a version number incremented.

In one embodiment, upon receipt of instructions, CMS 912 may determine whether a given instruction is a branching instruction such as JMP, CALL, or RET. If the instruction is not a branching instruction, CMS 912 may pass the instruction on to interpreter engine 922 or translation engine 924 for further evaluation and allow the instruction to proceed to execution engine 916 for execution. If the instruction is a branching instruction, CMS 912 may continue to evaluate the instruction for control-flow security issues.

In another embodiment, CMS 912 may determine whether control flow security is enabled by accessing extension 920 for "PPIB-ENABLE." If control flow is not enabled, CMS 912 may pass the instruction on to interpreter engine 922 or translation engine 924 for further evaluation and allow the instruction to proceed to execution engine 916 for execution. If control flow is enabled, CMS 912 may continue to evaluate the instruction for control-flow security issues.

In yet another embodiment, CMS 912 may determine whether the destination of the branching instruction is an acceptable destination based upon the source of the branching instruction. CMS 912 may perform such checks by, for example, accessing PPIBCS 926. The access may be made by, for example, interpreter engine 922 or translation engine 924. Based upon the evaluation by accessing PPIBCS 926 and any other information referenced by PPIBCS 926, CMS 912 may allow the instruction to be executed by execution pipeline 916. If the instruction is not allowed according to PPIBCS 926, CMS 912 may block the instruction or issue a notification for handling the instruction. CMS 912 may, for example, issue an exception, interrupt, or other suitable notification.

FIG. 10 is an illustration of example operation of system 900 to perform control-flow security in view of a malicious attack, in accordance with embodiments of the present disclosure. In FIG. 10 and in subsequent figures, memory addresses may be referred to in "NxNNN" notation, though this is used for expediency. Any suitable architecture and manner in referring to memory addresses may be used.

A memory segment 1004 may include multiple instructions with parameters at various locations denoted in an abbreviated hexadecimal notation. Execution pointer 1002 may indicate that the instruction at 0x1230 is to be executed next.

The instruction at 0x1230 may state "JMP *EAX", wherein program will jump to the address that is the value of the EAX register. In a normal situation, the EAX register at execution address 0x1230 may include an acceptable destination such as 0x1300, which may correspond to the beginning of code to perform a given function, such as Function1. However, a malicious attack may change the value of the EAX register such that the jump performed may lead to other, unintended addresses to be executed. For example, the EAX register may be compromised and loaded with values for 0x1000, 0x1001, or 0x1508.

At the address 0x1000, the instruction "POP EBX" may cause a value to be popped from the stack and loaded into the EBX register. The value on top of the stack may be the address of an unintended code segment, misused to compromise the safety of the program. The value on top of the stack may have been written by another instruction, not shown. The value may include, for example, "0x1508". Execution may proceed to 0x1001.

At the address 0x1001, the instruction "JMP *EBX" may cause a JMP to the address specified in the EBX register. If the EBX register was previously loaded with "0x1508" as described above, then the program may jump to the address 0x1508 for execution.

At the address 0x1508, execution of code resident therein may begin. In one example, the code may include unintended code such as Function 2.

Accordingly, if the value of the EAX register can be changed to 0x1000, or even 0x1508, control flow of the program may be redirected by malware as it will execute Function 2. In one embodiment, given a branching instruction at address 0x1230, CMS 914 may determine what destinations are known to be acceptable for the given source address. In a further embodiment, CMS 914 may determine what destinations are known to be acceptable based upon the use of branching instructions. In another embodiment, CMS 914 may determine whether the actual value, such as "*EAX", is included within such known destinations. If the value is included in the known destinations, then the instruction may be allowed to execute. If the value is not included in the known destinations, then the instruction may generate an exception, interrupt, error, or other notification mechanism to deny the branch or initiate additional investigation. In the example of FIG. 10, JMP parameters of "*EAX" at address 0x1230 of 0x1000, 0x1001, or 0x1508 may lead to unknown destinations and thus be blocked. JMP parameters of "*EAX" at address 0x1230 of 0x1300 may lead to a known, acceptable destination and thus allowed.

In one embodiment, CMS 914 may access PPIBCS 926 to determine whether, for a branching instruction at a given source location, the branching instruction would result in an acceptable, expected location or an unexpected location.

Figure 11:
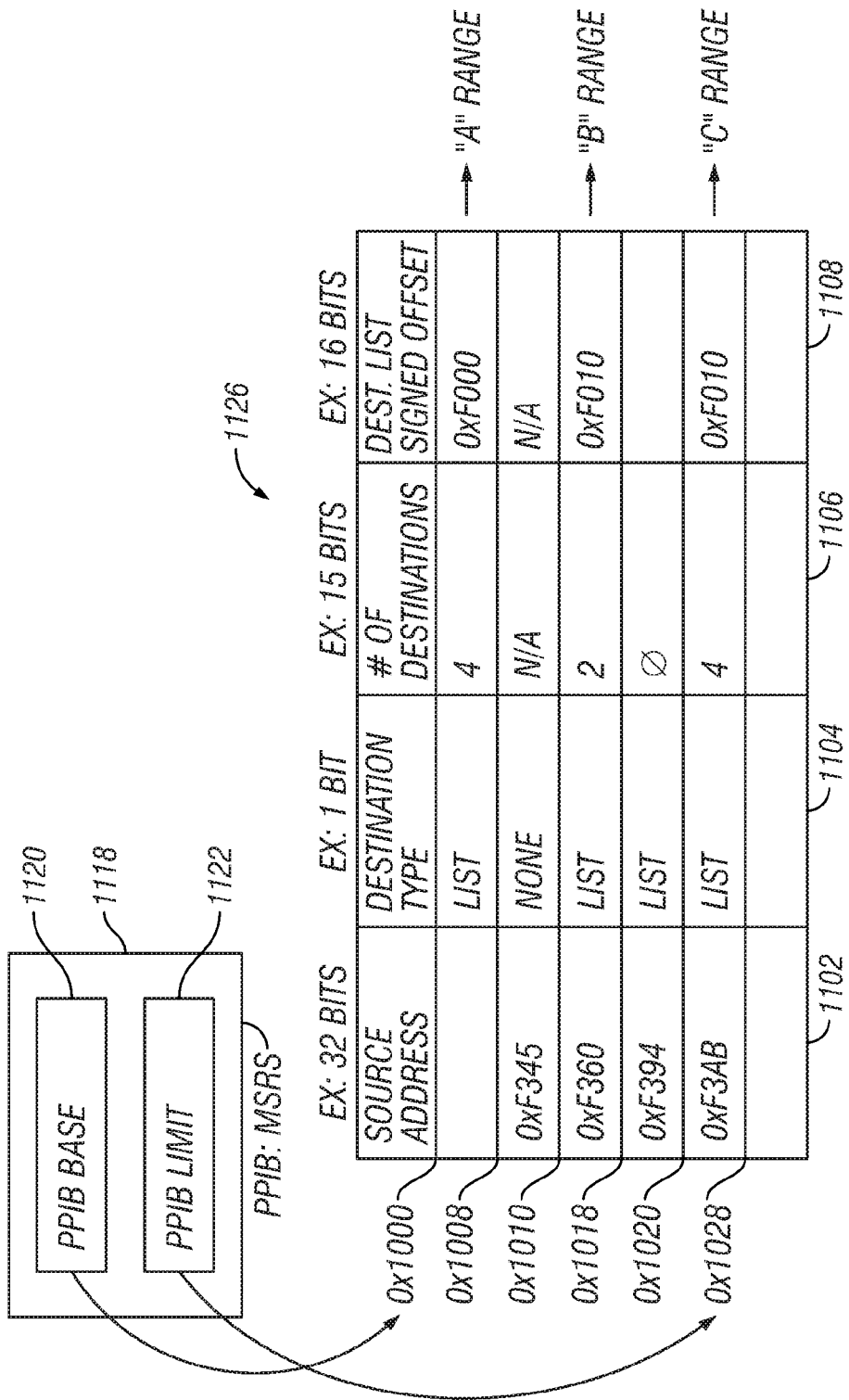
FIG. 11 is an illustration of an example embodiment of a control structure, in accordance with embodiments of the present disclosure.
Figure 11:
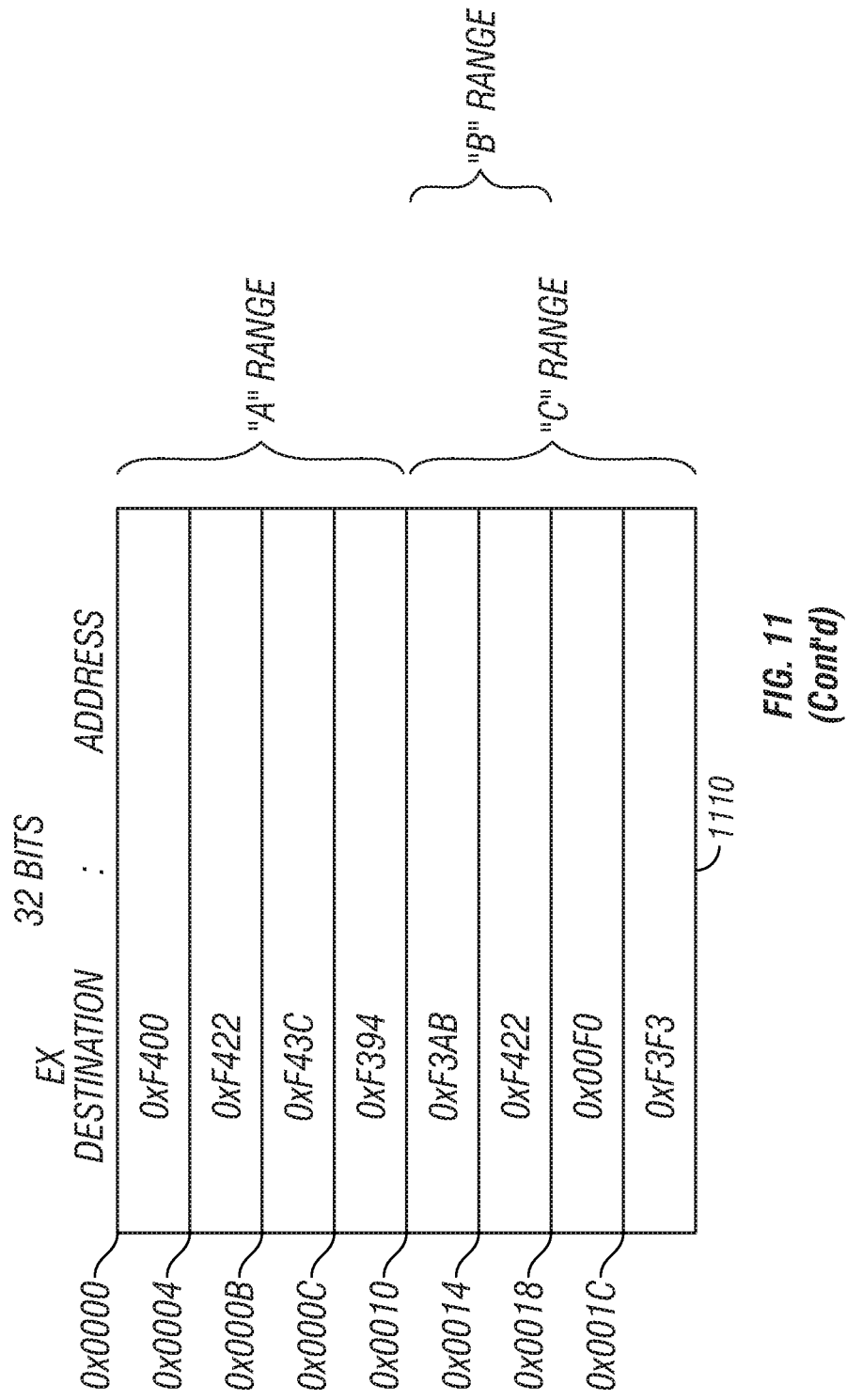

FIG. 11 is an illustration of an example embodiment of a PPIBCS 1126, in accordance with embodiments of the present disclosure. Furthermore, FIG. 11 may illustrate a memory segment 1110. PPIBCS 1126 and memory segment 1110 may be implemented as elements within memory, cache, linear data structures, or any other suitable representation. In one embodiment, PPIBCS 1126 and memory segment 1110 may be included within a same memory, cache, data structure, or other location. In another embodiment, PPIBCS 1126 and memory segment 1110 may be included within different memories, caches, data structures, or other locations. In the example of FIG. 11, PPIBCS 1126 and memory segment 1110 may be implemented within the same memory, cache, or otherwise be addressed by common memory addressing scheme. PPIBCS 1126 may implement, fully or in part, PPIBCS 926. Furthermore, memory segment 1110 may implement PPIBCS 926 in part, or may implement another aspect of FIG. 9 not illustrated therein. Although the same, specific memory addresses may be used as examples in both FIG. 10 and FIG. 11, the examples may be considered independently without reference to each other.

PPIBCS 1126 is illustrated as a table implemented by continuous memory locations. In various embodiments, PPIBCS 1126 may be implemented by contiguous memory, hashed memory, or any other suitable manner for arranging its contents to be accessible by CMS 914.

PPIBCS 1126 may include any suitable indication of source addresses and identification of safe, known, or expected destinations associated with such source addresses. PPIBCS 1126 may include any suitable indication of source addresses and identification of unknown, unsafe, or unexpected destinations associated with such source addresses. In one embodiment, PPIBCS 1126 may include, for each entry corresponding to a source address, an identifier 1102 of the source address. Identifier 1102 may be, for example, thirty-two bits wide. In a further embodiment, if a source address is not given, the entry may be a default entry for any source addresses of control-flow instructions wherein the source address is not found within PPIBCS 1126.

In another embodiment, PPIBCS 1126 may include, for each entry corresponding to a source address, an identifier 1104 of the destination type. Identifier 1104 may be, for example, one bit wide. In a further embodiment, the destination type may indicate a list, wherein the list will include acceptable destinations for the control-flow instructions at the source address. If a list is not indicated, then restrictions may be enforced on control-flow instructions at the source address.

In yet another embodiment, PPIBCS 1126 may include, for each entry corresponding to a source address, an identifier 1106 of the size of the list corresponding to the number of identified and acceptable destinations. Identifier 1106 may be, for example, fifteen bits wide. If a list of size zero is indicated, then no destinations will be acceptable for control-flow instructions at the source address.

In another embodiment, PPIBCS 1126 may include, for each entry corresponding to a source address, an identifier 1108 of a location of the list of acceptable destinations. Any suitable mechanism for identifying a location may be used. In a further embodiment, the identifier may specific an offset from the start of PPIBCS 1126 for the start of the list also identified by identifiers 1104, 1106. The offset may include a signed offset, wherein the list begins at an earlier memory location than the start of PPIBCS. Identifier 1106 may be, for example, sixteen bits wide. If no location is indicated, then no destinations will be acceptable for control-flow instructions at the source address.

Accordingly, for each entry, a list of acceptable destinations may be specified by the combination of identifiers for a location of the list, a size of the list, and an existence of the list. In the example of FIG. 11, PPIBCS 1126 may begin at location 0x1000 and include a new entry every sixty-four bits or eight bytes. At 0x1000, a default entry may be included. In one embodiment, the first element of PPIBCS 1126 may be considered to be the default entry. The source address value of the default entry may be ignored. In one embodiment, use of the default entry as the first entry of PPIBCS 1126 may prevent the need of an extra bit for entries to specify that a source address is present. The default entry may indicate that, if a source of a control-flow instruction is not otherwise known, it may be allowed to branch to four different destinations as listed at an offset of 0xF000 within the same memory. These may be referred to as range "A" located at address 0x0000 (computed as an offset of 0xF000 from the PPIBCS 1126 structure at address 0x1000). The next PPIBCS 1126 entry at 0x1008 may specify that the source address 0xF345 is not to be restricted as to its acceptable indirect-branch destinations. In one embodiment, such an allowance may be designated by the destination type specified as "none" in identifier 1104. Furthermore, dummy values or no values may be identified in identifiers 1106, 1108. The next PPIBCS 1126 entry at 0x1010 may specify that the source address 0xF360 has a list of two acceptable destinations beginning at an offset of 0xF010, which, when added to the base address of the PPIBCS 1126 of 0x1000 leads to absolute address 0x0010. These may be referred to as range "B". The next entry at 0x1018 may specify that the source address 0xF394 has no acceptable destinations. In one embodiment, a range of no such acceptable destinations may be specified by a zero value in identifier 1106 for the number of destinations. The identifier 1108 in such an embodiment may be disregarded. In another embodiment, a range of no such acceptable destinations may be specified by a zero value in identifier 1108 for the offset. The last entry at 0x1020 may specify that the source address 0xF3AB has a list of four acceptable destinations beginning at an offset of 0xF010. These may be referred to as range "C".

In one embodiment, lists of acceptable destinations may be specified in contiguous order. In another embodiment, lists of acceptable destinations may be specified in a hash table. In various embodiments, lists of acceptable destinations may overlap each other. For example, destinations in range "B" may also be located within range "C", indicating that the overlapping destinations may be acceptable for control-flow logic from the source addresses designated in both PPIBCS 1126 entries at 0x1010 and 0x1020.

Memory segment 1110 illustrates some of the destinations described in PPIBCS 1126. In one embodiment, memory segment 1110 may be shown using contiguous memory, though any suitable manner of organizing the destinations may be used. Memory segment 1110 may include a list of identifiers, each specifying an address. The addresses may be acceptable destinations for branching operations originating from various source addresses in PPIBCS 1126. In one embodiment, the addresses may be thirty-two bits wide.

In the example of FIG. 11, at address 0x0000, corresponding to the negative offset illustrated in PPIBCS 1126 for default entries and range "A", destination address 0xF400 may be specified. Thus, branching operations may be performed from any address to the address 0xF400. The next three elements may also be included within range "A" and thus be branched to from any address.

Furthermore, at address 0x0010, corresponding to the negative offset illustrated in PPIBCS 1126 for source addresses 0xF360 and 0xF3AB and ranges "B" and "C", destination address 0xF3AB may be specified. Thus, branching operations may be performed from these source addresses to this destination address. For range "B" and source address 0xF360, the next entry at address 0x1014 may similarly indicate acceptable destinations. For range "C" and source address 0xF3AB, the next three entries may similarly indicate acceptable destinations.

The location of PPIBCS 1126 may be specified in any suitable manner. In one embodiment, PPIBCS 1126 may be specified for use by CMS 914 by PPIB MSRs 1118. PPIB MSRs 1118 may include a PPIB base 1120 indicating a starting address of PPIBCS 1126 and a PPIB limit 1122 indicating an ending address of PPIBCS 1126. PPIB MSRs 1118 may be set by the same entity that populates PPIBCS 1126. For example, PPIB base 1120 may specify the address 0x1000 and PPIB limit 1122 may specify the address 0x1028.

In various embodiments, the same expected or known destination may appear in multiple lists. Thus, the lists of acceptable destinations for different source addresses are not necessarily distinct.

Figure 12A:
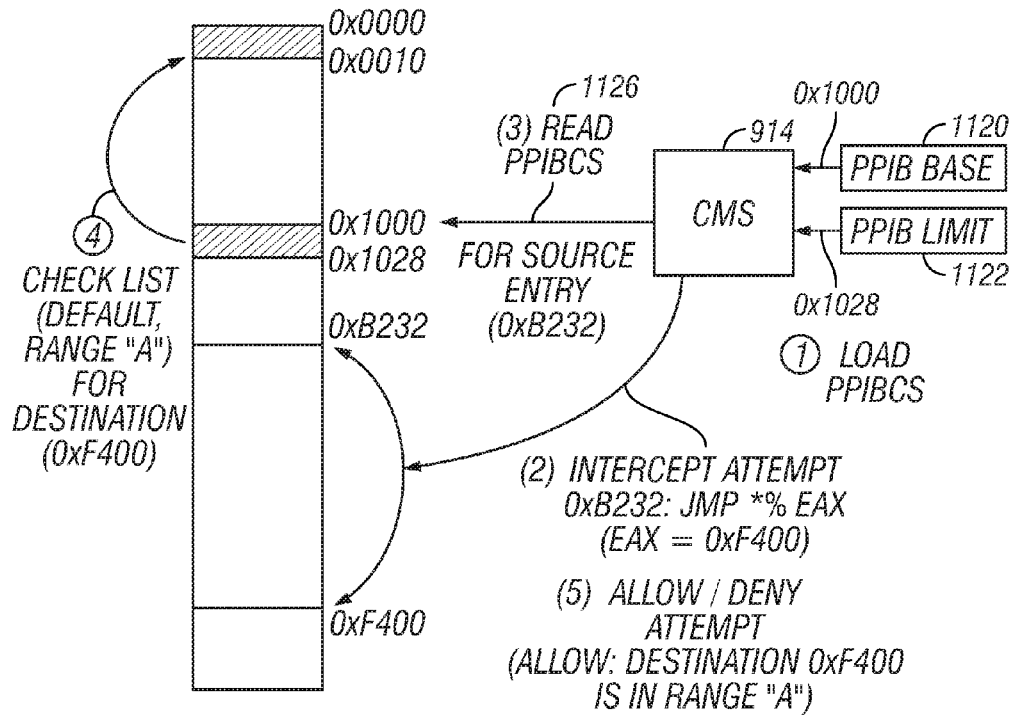
FIGS. 12A, 12B, 12C, 12D, and 12E illustrate example operation of a system to perform control-flow security, in accordance with embodiments of the present disclosure.

FIGS. 12A, 12B, 12C, 12D, and 12E illustrate example operation of system 900, in accordance with embodiments of the present disclosure. In FIG. 12A at (1), in one embodiment CMS 914 may load the location of PPIBCS 1126 from PPIB base 1120 and PPIB limit 1122. Such a location in memory may begin at 0x1000 and end at 0x1028. PPIBCS 1126 may be populated as shown in FIG. 11 according to instructions received at processor 904.

At (2), in one embodiment CMS may intercept an attempted control flow branch. The control flow branch, sourced at address 0xB232, may include the instruction "JMP *% EAX" where EAX holds the value 0xF400.

At (3), in one embodiment CMS 914 may read PPIBCS 1126 to determine whether it has any entries corresponding to the source address. For example, CMS 914 may read PPIBCS 1126 for any entries corresponding to the source address 0xB232. The PPIBCS may be between 0x1000 and 0x1028. As shown in FIG. 11, there are no entries for such a source address. Thus, in another embodiment CMS 914 may utilize the default list of acceptable destinations specified in PPIBCS 1126. Such a default list may correspond to the four values beginning at address 0x0000 and ending at 0x0010.

At (4), in one embodiment the list of acceptable destinations may be read to determine whether the instruction's target address is included therein. For example, the default range "A" may be checked for destination address 0xF400.

At (5), in one embodiment the instruction may be allowed if the destination was found in the list. The instruction may be denied, or an interrupt or exception generated for additional handling, if the destination was not found in the list. For example, the destination 0xF400 may have been found in the list contents shown in FIG. 11, and thus the instruction may be allowed.

Figure 12B:
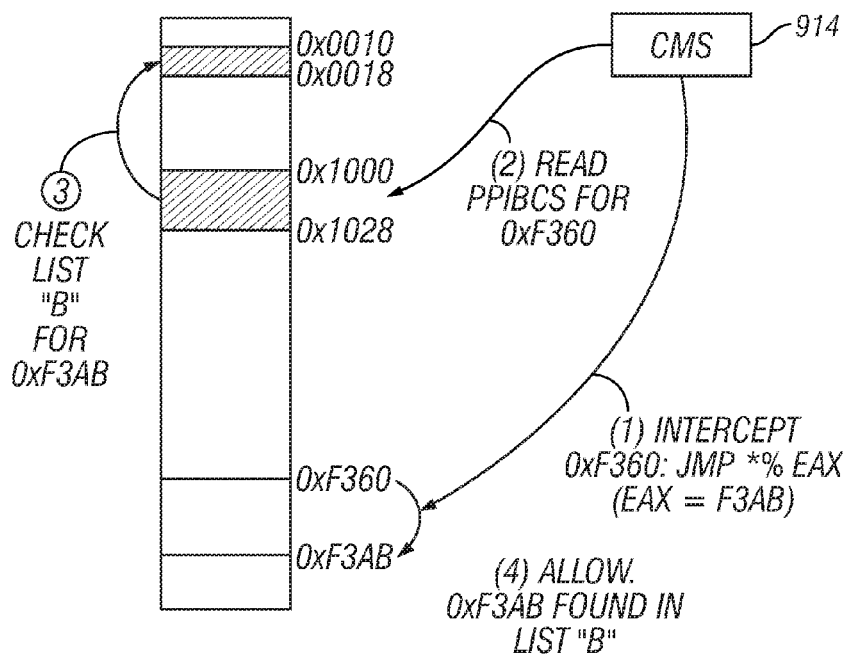

In FIG. 12B, it may be presumed that PPIBCS 1126 has already loaded. At (1), CMS 914 may intercept an attempted control flow branch including "JMP *% EAX" (where EAX holds the value 0xF3AB) located at source memory address 0xF360. At (2), CMS 914 may read PPIBCS 1126 to determine whether it has any entries corresponding to the source memory address 0xF360. As shown in FIG. 11, there is an entry in PPIBCS 1126 for such a source address, pointing to range "B" stored at 0x0010. At (3), the list of acceptable destinations for range "B" may be read to determine whether the instruction's target address, 0xF3AB, is included therein. At (4), the instruction may be allowed because the target address was found in the list of addresses within range "B" shown in FIG. 11.

Figure 12C:
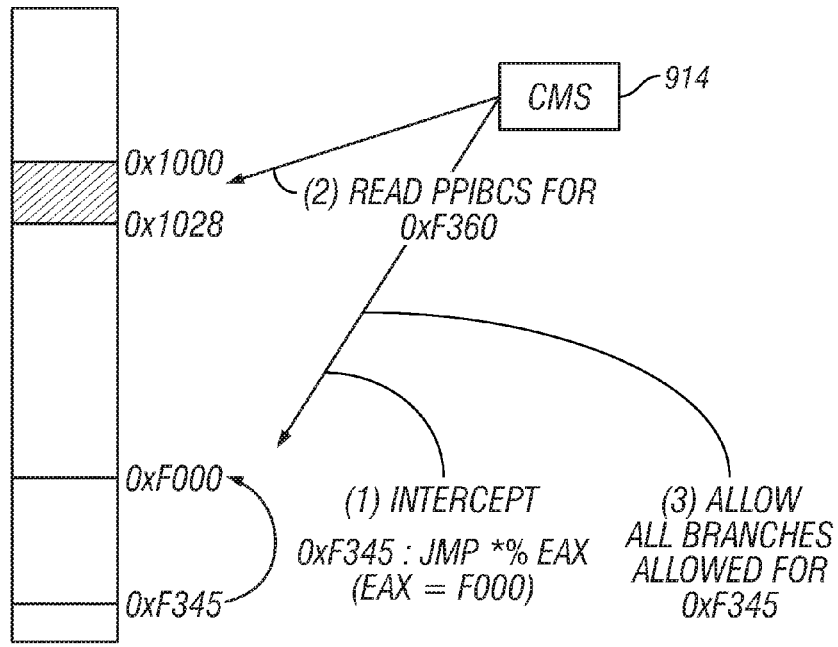

In FIG. 12C, it may be presumed that PPIBCS 1126 has already loaded. At (1), CMS 914 may intercept an attempted control flow branch including "JMP *% EAX" (where EAX holds the value 0xF000) located at source memory address 0xF345. At (2), CMS 914 may read PPIBCS 1126 to determine whether it has any entries corresponding to the source memory address 0xF345. As shown in FIG. 11, an entry exists in PPIBCS 1126 for such a source memory address, which allows any destination address. Thus, at (3), the instruction may be allowed.

Figure 12D:
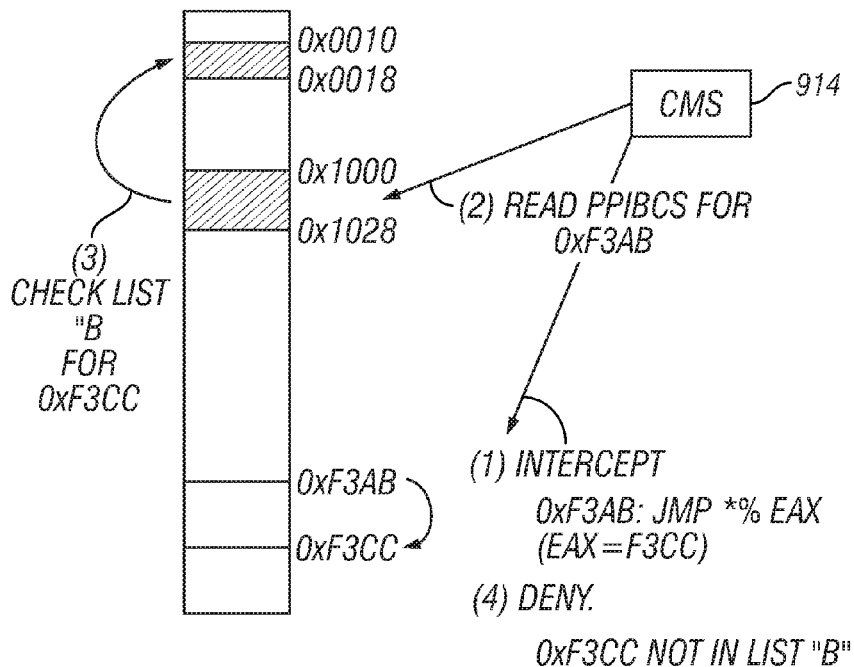

In FIG. 12D, it may be presumed that PPIBCS 1126 has already loaded. At (1), CMS 914 may intercept an attempted control flow branch including "JMP *% EAX" (where EAX holds the value 0xF3CC) located at source memory address 0xF3AB. At (2), CMS 914 may read PPIBCS 1126 to determine whether it has any entries corresponding to the source memory address 0xF3AB. As shown in FIG. 11, there are four entries for such a source address, wherein the entries begin at 0x0010 and correspond to range "C". At (3), the list of acceptable destinations for range "C" may be read to determine whether the instruction's target address, 0xF3CC, is included therein. At (4), the instruction may be denied because the target address was not found in the list of addresses within range "C" shown in FIG. 11.

Figure 12E:
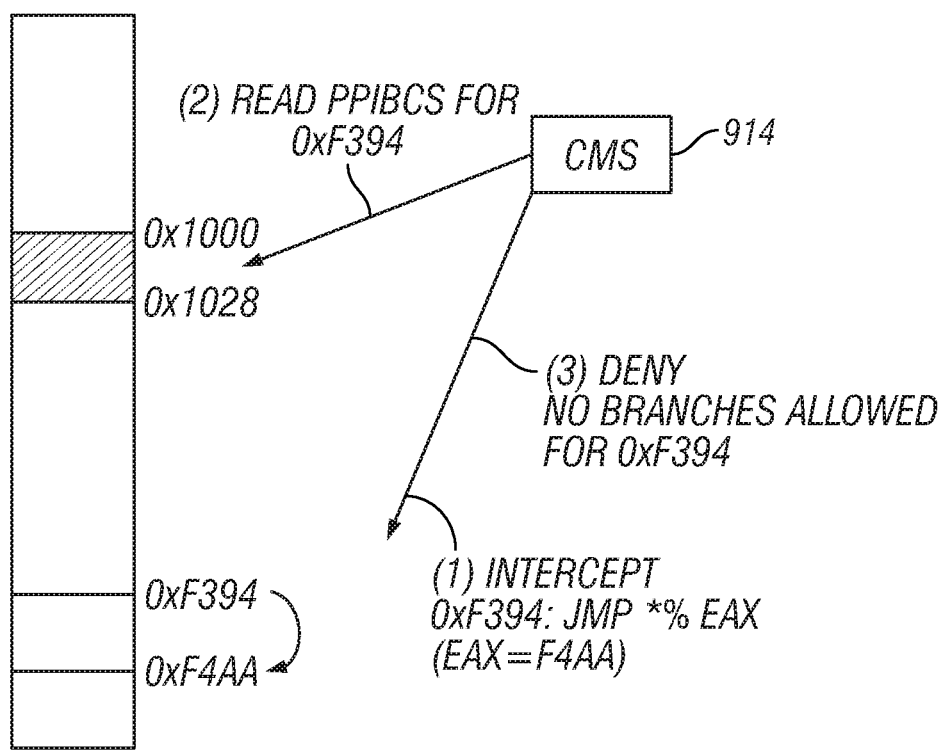

In FIG. 12E, it may be presumed that PPIBCS 1126 has already loaded. At (1), CMS 914 may intercept an attempted control flow branch including "JMP *% EAX" (where EAX holds the value 0xF4AA) located at source memory address 0xF394. At (2), CMS 914 may read PPIBCS 1126 to determine whether it has any entries corresponding to the source memory address 0xF394. As shown in FIG. 11, an entry exists in PPIBCS 1126 for such a source memory address, which does not allow any destinations for branching. Thus, at (3), the instruction may be denied.

Returning to FIG. 9, PPIBCS 926 may be organized as a hash table indexed by source address. Destination lists referenced by PPIBCS 926 may be organized in architectural registers or caches as linear lists or as hash tables. In various embodiments, destination lists that are short may be maintained as linear lists and longer lists may be maintained as hash tables. If additional space is required for longer lists of destinations, a secondary hash table may be created. Tradeoffs between linear and hash lookup may be made in selecting a solution for maintaining the data. In one embodiment, PPIBCS 1110 of FIG. 11 may illustrate a logical structure to convey policy to the processor. In another embodiment, PPIBCS 926 of FIG. 9 may illustrate an internal representation of policies. In such an embodiment, PPIBCS 926 may need to be further implemented in, for example, the manner in which PPIBCS 1126 is implemented.

Both interpreter engine 922 and translation engine 924 may be able to perform control-flow security. Instructions, when first executed, may be interpreted an instruction at a time by interpreter engine 922. When interpreting the instructions, interpreter engine 922 may add logic to the handler of indirect jumps to look up entries in PPIBCS 926 with the source address of the instruction, and locate the destination address, throwing an exception if the destination is not found. The following logic or pseudo-code is provided for a ValidatePPIB logic to enforce PPIB checks. If the function returns false, then a control flow exception may be raised.

```
ValidatePPIB (SourceAddress, DestinationAddress)
    /* returns TRUE when the jump is allowed
    IF PPIB-ENABLED == 0
      THEN RETURN TRUE
DestinationList =
PPIBCSInternal.SourceHashtableLookup(SourceAddress)
If DestinationList == NotFound
    THEN DestinationList = PPIBCSInternal.DefaultDestinationList
If DestinationList.Linear == TRUE
    THEN Destination =
    DestinationList.LinearLookup(DestinationAddress)
    ELSE Destination = DestinationList.HashLookup(DestinationAddress)
If Destination == NotFound
    THEN RETURN FALSE
    ELSE RETURN TRUE
```

PPIB-ENABLED may include an internal configuration variable of CMS 914 that is set based upon indicator 920, indicating whether PPM checking is enabled. PMCSInternal may be an internal data structure created for PPIBCS 926 when it is installed. A function SourceHashtableLookup may look up a source address from the original address space and returns NotFound if the source is not found in PPIBCS 926 or a DestinationList structure. DestinationList may be an internal data structure representing the destinations allowed for a source, as those shown in FIG. 11. DestinationList may be included within PPMCSInternal. DestinationList may include a field called Linear, which can be TRUE to indicate that the destinations are arranged as a linear sorted list, or FALSE to indicate that the destinations are arranged as a hash table. It may include the function LinearLookup, which may look up a destination address and return TRUE if that destination is found in the destination list or FALSE if that destination is not found in the destination list. If Linear is FALSE, then LinearLookup may have undefined behavior. DestinationList may also admit the function HashLookup, which may look up a destination address and returns TRUE if that destination is found or FALSE otherwise. If Linear is TRUE, then HashLookup may have undefined behavior. DefaultDestinationList may be a field of the PPMCSInternal data structure, which is a DestinationList. It may hold the destination list for the default entry of PPIBCS 926, and otherwise may behave like other DestinationList entries as above.

Interpretation engine 922 may be used for only some instructions. Once a region of code 902 has been identified to be reasonably frequent, CMS 914 may create a translation that runs directly on the underlying microarchitecture, and emulates the behavior of the code region. CMS 914 may account for this behavior with respect to control-flow security through use of translation engine 924.

For an indirect jump, translation engine 924 may set up the translated code block to look in indirect branch target cache (IBTC) 928 for such a particular indirect branch. IBTC 928 may store the known mapping of target addresses to the corresponding translated code instruction addresses. The lookup may fail during the first access to IBTC 928. CMS 914 may discover the target address and populate IBTC 928 with both original and translated code addresses. Subsequently, the lookup action may verify that the "current" target of the indirect branch matches one of the cached addresses of IBTC 928, and subsequently jump to the corresponding address. If the lookup fails, CMS 914 may look up PPIBCS 926 and perform the check using the ValidatePPIB logic. Therefore, the translated code itself might have no additional instructions or logic for PPIB support and IBTC 928 hit path may add no additional overhead due to control-flow security. A miss in IBTC 928 may require ValidatePPIB logic or similar.

In one embodiment, an initial set of targets for a given indirect branch may be added to IBTC 928 during initialization. For example, IBTC 928 may be prepopulated if interpreter engine 922 discovers a single target for all invocations of a given indirect branch.

In another embodiment, CMS 914 may inline the comparison and lookup of the IBTC 928 or other caches in the translated code. CMS 914 may inline the comparison by storing a recent target of the indirect branch for comparison along with the corresponding translated address. During dynamic execution, if the then present target is same as the stored target, execution may jump to the translated target. If not, an indirect branch miss handler may be used to patch the translation by updating the translated code in-place without changing the total code footprint. For example, code may be patched to inline the most recently seen target for comparison and the corresponding translated address. Logic for ValidatePPIB can be called to validate any jump therein.

Figure 13:
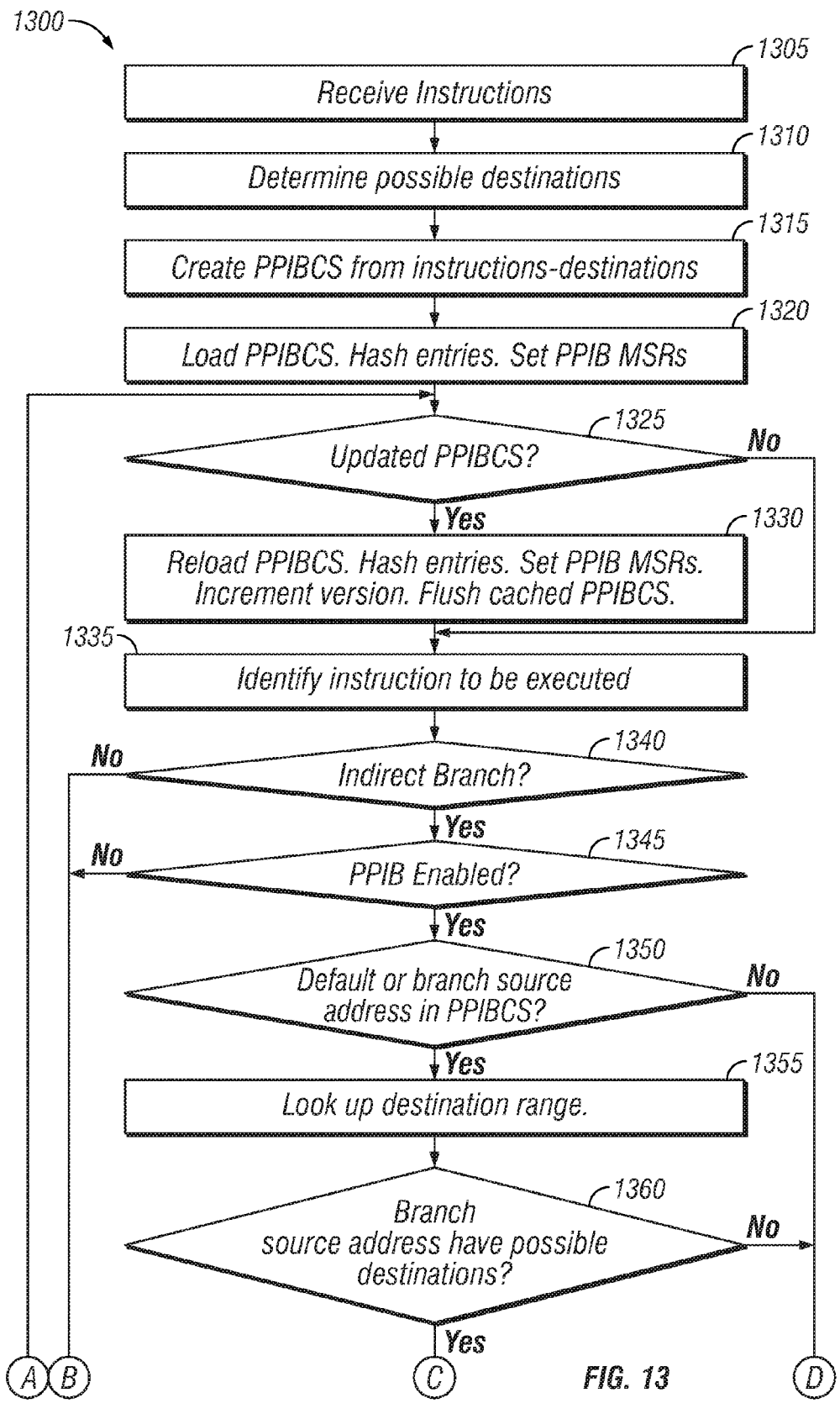
FIG. 13 illustrates an example method for implementing a binary translation mechanism for control-flow security, in accordance with embodiments of the present disclosure.
Figure 13:
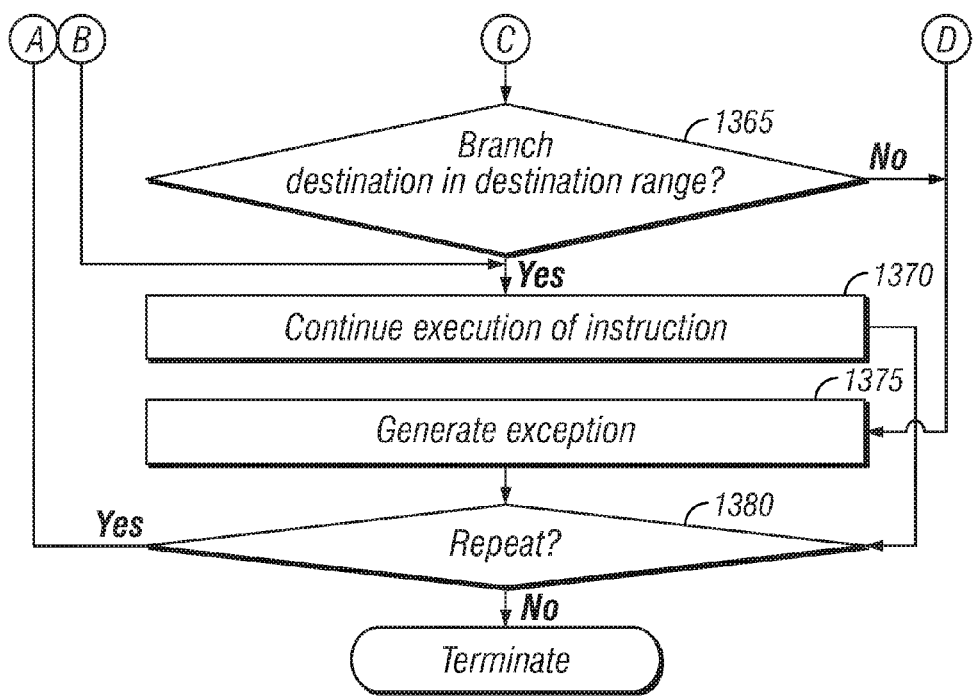

FIG. 13 is a flowchart of an example embodiment of a method 1300 for control-flow security, in accordance with embodiments of the present disclosure. Method 1300 may illustrate operations performed by, for example, processor 904 and CMS 914. Method 1300 may begin at any suitable point and may execute in any suitable order. In one embodiment, method 1300 may begin at 1305.

At 1305, instructions to be executed may be received. The instructions may be compiled, linked, interpreted, or in any other suitable format for analysis. At 1310, control-flow instructions within the instructions may be identified, along with addresses for possible branches resulting from such control-flow instructions. The association of source addresses of the control-flow instructions and the addresses of allowed destinations of the control-flow instructions may be recorded. At 1315, a control structure, such as a PPIBCS, may be created embodying the associations determined in 1310. The control structure may be implemented in any suitable manner, including lists, data structures, tables, contiguous memory, hashed memory, or other suitable formats. At 1320, the contents of the relationships between sources and allowed destinations may be loaded into the control structure. Hashes, if necessary, may be calculated. MSRs for control flow, such as registers enabling control-flow security or defining the location of the control structure, may be set. The control structure may be cached. Elements 1305, 1310, 1315, and 1320 may repeat in parallel with the remainder of method 1300 as necessary.

At 1325, it may be determined whether an updated control structure has been made. If no, method 1300 may proceed to 1335. If an updated control structure is available, then at 1330 the existing control structure may be flushed, the new control structure loaded, entries loaded and hashed, and MSRs set. The version of the control structure may be incremented.

At 1335, an instruction to be interpreted, executed, or emulated may be identified. At 1340, it may be determined whether the instruction includes control-flow logic, such as an indirect branch. If so, method 1300 may proceed to 1345. If not, method 1300 may proceed to 1370.

At 1345, it may be determined whether control-flow security checking has been enabled for the processor. Such a determination may be made, for example, by checking an MSR to see whether it has been set to enable control-flow checking. If it has been enabled, method 1300 may proceed to 1350. Otherwise, method 1300 may proceed to 1370.

At 1350, it may be determined whether a source address of the instruction is located in the control structure. A default entry may be specified. If the source address is not in the control structure and further if there are no default entries in the control structure, then method 1300 may proceed to 1375. If there is a source address of the instruction located in the control structure, or if there are default entries, method 1300 may proceed to 1355.

At 1355, a destination range for the source address may be looked up. Such a look up may be made in the control structure or in a redirect provided by the control structure. An open destination range, wherein any destination is allowed, may be specified by a type of destination. For example, if the type is given as "list" there may be a bounded list of available destinations for the source address. If the type is given as "none", then any destination may be allowed. A destination range may be specified by a number of entries and an offset for the beginning of such entries. If a number of entries available is set to zero, no destinations might be allowed for the source address.

At 1360, based upon such a lookup, it may be determined whether the branch source address has any allowed destinations. If not, such as examples wherein a number of entries is set to zero, method 1300 may proceed to 1375. If the source address has destinations, then method 1300 may proceed to 1365.

At 1365, it may be determined whether the destination of the branch instruction from 1335 is found within the destination range determined in 1355. The determination may be made by, for example, looking up entries in the control structure or looking up entries redirected from the control structure. If the destination of the instruction is included within the destination range, then the instruction is attempting to direct execution to a known, expected address. Furthermore, if the destination range is open and without restriction, then the instruction may be allowed to branch to the address. Accordingly, method 1300 may proceed to 1370. If the destination of the instruction is not included within the destination range, then the instruction is attempted to direct execution to an unexpected address. Accordingly, method 1300 may proceed to 1375.

At 1375, the instruction may cause a fault, exception, interrupt, or other message to be generated that the instruction is potentially executing harmful code. The instruction may be denied further execution or blocked. Any suitable corrective action may be taken.

At 1380, it may be determined whether to repeat. If so, method 1300 may proceed to 1325. Otherwise, method 1300 may terminate.

Method 1300 may be initiated by any suitable criteria. Furthermore, although method 1300 describes an operation of particular elements, method 1300 may be performed by any suitable combination or type of elements. For example, method 1300 may be implemented by the elements illustrated in FIGS. 1-12 or any other system operable to implement method 1300. As such, the preferred initialization point for method 1300 and the order of the elements comprising method 1300 may depend on the implementation chosen. In some embodiments, some elements may be optionally omitted, reorganized, repeated, or combined. Furthermore, method 1300 may be performed fully or in part in parallel with each other.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor, comprising:
a front end including circuitry to receive an instruction and to dispatch the instruction to a binary translator;
an execution pipeline; and
a binary translator including circuitry to:
determine whether the instruction includes a control-flow instruction;
identify a source address of the instruction;
identify a target address of the instruction, the target address including an address to which execution would indirectly branch upon execution of the instruction;
determine whether the target address is a known destination based upon the source address; and
determine whether to route the instruction to the execution pipeline based upon the determination whether the target address is a known destination based upon the source address.

2. The processor of claim 1, wherein the binary translator further includes circuitry to:

access a control structure with references of a set of known destinations for the source address; and
determine whether the target address is identified with the set of known destinations.

3. The processor of claim 1, wherein the binary translator further includes circuitry to:
access a control structure with no known destinations for the source address; and
determine to not route the instruction to the execution pipeline based on a determination that there are no known destinations for the source address.

4. The processor of claim 1, wherein the binary translator further includes circuitry to:
access a control structure with references of a set of known destinations for each of a set of given source addresses;
access a default set of known destinations based on a determination that there is no entry in the control structure for the source addresses; and
determine whether to route the instruction to the execution pipeline based upon whether the target address is included in the default set of known destinations.

5. The processor of claim 1, wherein the binary translator further includes circuitry to route another instruction to the execution pipeline based upon a determination that the other instruction does not include a control-flow instruction.

6. The processor of claim 1, wherein the binary translation further includes circuitry to:
access a control structure with references of a set of known destinations for each of a set of given source addresses;
determine that the target address is not within the set of known destinations for the source address;
generate an exception based upon the determination that the target address is not within the set of known destinations for the source address.

7. The processor of claim 1, wherein the binary translation further includes circuitry to:
access a control structure with entries for a plurality of given source addresses, wherein each entry defines:
whether any known destinations are available for a given source address;
a size of a list of known destinations; and
an offset to a memory segment for the list of known destinations;
access the memory segment based upon the offset; and
determine whether the target address is within the list of known destinations.

8. A system, comprising:
a front end including circuitry to receive an instruction and to dispatch the instruction to a binary translator;
an execution pipeline; and
a binary translator including circuitry to:
determine whether the instruction includes a control-flow instruction;
identify a source address of the instruction;
identify a target address of the instruction, the target address including an address to which execution would indirectly branch upon execution of the instruction;
determine whether the target address is a known destination based upon the source address; and
determine whether to route the instruction to the execution pipeline based upon the determination whether the target address is a known destination based upon the source address.

9. The system of claim 8, wherein the binary translator further includes circuitry to:
access a control structure with references of a set of known destinations for the source address; and
determine whether the target address is identified with the set of known destinations.

10. The system of claim 8, wherein the binary translator further includes circuitry to:
access a control structure with no known destinations for the source address; and
determine to not route the instruction to the execution pipeline based on a determination that there are no known destinations for the source address.

11. The system of claim 8, wherein the binary translator further includes circuitry to:
access a control structure with references of a set of known destinations for each of a set of given source addresses;
access a default set of known destinations based on a determination that there is no entry in the control structure for the source addresses; and
determine whether to route the instruction to the execution pipeline based upon whether the target address is included in the default set of known destinations.

12. The system of claim 8, wherein the binary translator further includes circuitry to route another instruction to the execution pipeline based upon a determination that the other instruction does not include a control-flow instruction.

13. The system of claim 8, wherein the binary translation further includes circuitry to:
access a control structure with references of a set of known destinations for each of a set of given source addresses;
determine that the target address is not within the set of known destinations for the source address;
generate an exception based upon the determination that the target address is not within the set of known destinations for the source address.

14. The system of claim 8, wherein the binary translation further includes circuitry to:
access a control structure with entries for a plurality of given source addresses, wherein each entry defines:
whether any known destinations are available for a given source address;
a size of a list of known destinations; and
an offset to a memory segment for the list of known destinations;
access the memory segment based upon the offset; and
determine whether the target address is within the list of known destinations.

15. At least one non-transitory machine readable storage medium, comprising computer-readable instructions carried on the machine readable medium, the instructions readable by a hardware processor, the instructions, when read and executed, for causing the processor to perform:
receiving an instruction;
determining whether the instruction includes a control-flow instruction;
identifying a source address of the instruction;
identifying a target address of the instruction, the target address including an address to which execution would indirectly branch upon execution of the instruction;
determining whether the target address is a known destination based upon the source address; and determining whether to route the instruction to an execution pipeline based upon the determination whether the target address is a known destination based upon the source address.

16. The at least one non-transitory machine readable storage medium of claim 15, further comprising instructions to cause the processor to perform:
accessing a control structure with references of a set of known destinations for the source address; and
determining whether the target address is identified with the set of known destinations.

17. The at least one non-transitory machine readable storage medium of claim 15, further comprising instructions to cause the processor to perform:
accessing a control structure with no known destinations for the source address; and
determining to not route the instruction to the execution pipeline based on a determination that there are no known destinations for the source address.

18. The at least one non-transitory machine readable storage medium of claim 15, further comprising instructions to cause the processor to perform:
accessing a control structure with references of a set of known destinations for each of a set of given source addresses;
accessing a default set of known destinations based on a determination that there is no entry in the control structure for the source addresses; and
determining whether to route the instruction to the execution pipeline based upon whether the target address is included in the default set of known destinations.

19. The at least one non-transitory machine readable storage medium of claim 15, further comprising instructions to cause the processor to perform routing another instruction to the execution pipeline based upon a determination that the other instruction does not include a control-flow instruction.

20. The at least one non-transitory machine readable storage medium of claim 15, further comprising instructions to cause the processor to perform:
accessing a control structure with references of a set of known destinations for each of a set of given source addresses;
determining that the target address is not within the set of known destinations for the source address;
generating an exception based upon the determination that the target address is not within the set of known destinations for the source address.

* * * * *